(12) United States Patent
Noheji et al.

(10) Patent No.: US 10,419,153 B2
(45) Date of Patent: Sep. 17, 2019

(54) OPTICAL TRANSMITTER AND OPTICAL TRANSMITTING METHOD

(71) Applicant: Fujitsu Optical Components Limited, Kawasaki-shi, Kanagawa (JP)

(72) Inventors: Kiyotoshi Noheji, Kawasaki (JP); Masato Nishihara, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 16/139,503

(22) Filed: Sep. 24, 2018

(65) Prior Publication Data

US 2019/0109668 A1 Apr. 11, 2019

(30) Foreign Application Priority Data

Oct. 6, 2017 (JP) ................................ 2017-196181

(51) Int. Cl.
*H04J 14/02* (2006.01)
*H04B 10/572* (2013.01)
*H04L 27/26* (2006.01)

(52) U.S. Cl.
CPC ........ *H04J 14/0278* (2013.01); *H04B 10/572* (2013.01); *H04J 14/0298* (2013.01); *H04L 27/2697* (2013.01)

(58) Field of Classification Search
CPC .............. H04J 14/0278; H04J 14/0298; H04B 10/572; H04L 27/2697
USPC .......................................................... 398/79
See application file for complete search history.

(56) References Cited

U.S. PATENT DOCUMENTS

| 2014/0099115 A1* | 4/2014 | Tanaka | ................... | H04J 14/028 398/76 |
| 2018/0026716 A1* | 1/2018 | Takita | ................. | H04J 14/0263 398/82 |

\* cited by examiner

*Primary Examiner* — Mohammad R Sedighian
(74) *Attorney, Agent, or Firm* — Staas & Halsey LLP

(57) ABSTRACT

An optical transmitter includes: a light source; a wavelength detecting unit configured to detect a wavelength of light emitted from the light source; a wavelength difference information generating unit configured to generate wavelength difference information representing a wavelength difference between a predetermined reference wavelength and a wavelength of the light detected by the wavelength detecting unit; a subcarrier count determination unit configured to determine a number of subcarriers to be used, based on the wavelength difference indicated by the wavelength difference information; a multi-valued level determination unit configured to determine, for each of the subcarriers, a multi-valued level which is a number of bits transmitted by a corresponding subcarrier of the subcarriers; a modulated signal generating unit configured to generate a modulated signal by modulating the subcarriers such that each of the subcarriers has the determined multi-valued level.

7 Claims, 24 Drawing Sheets

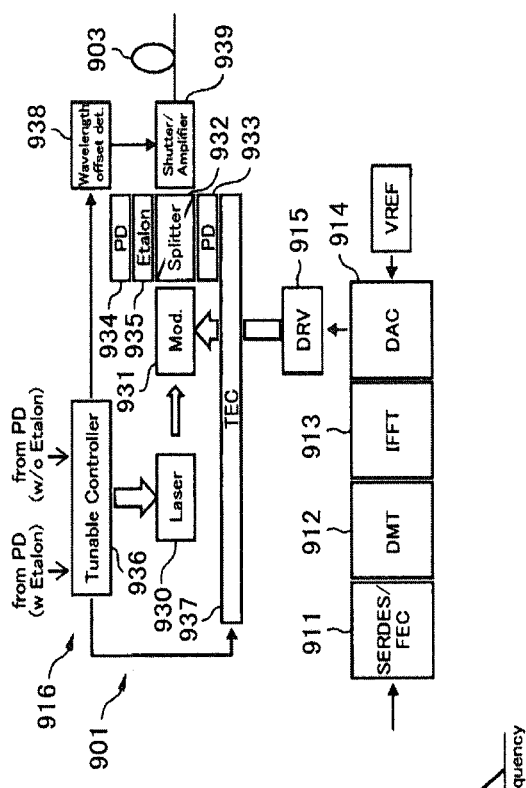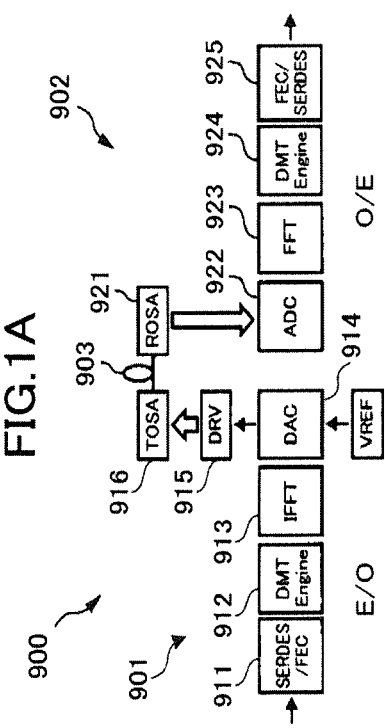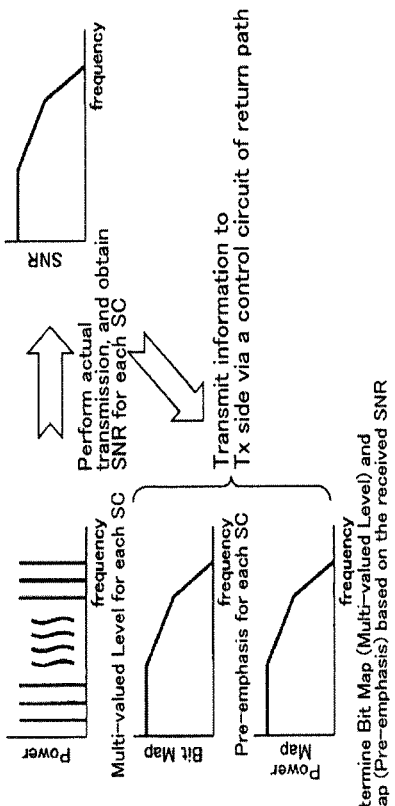

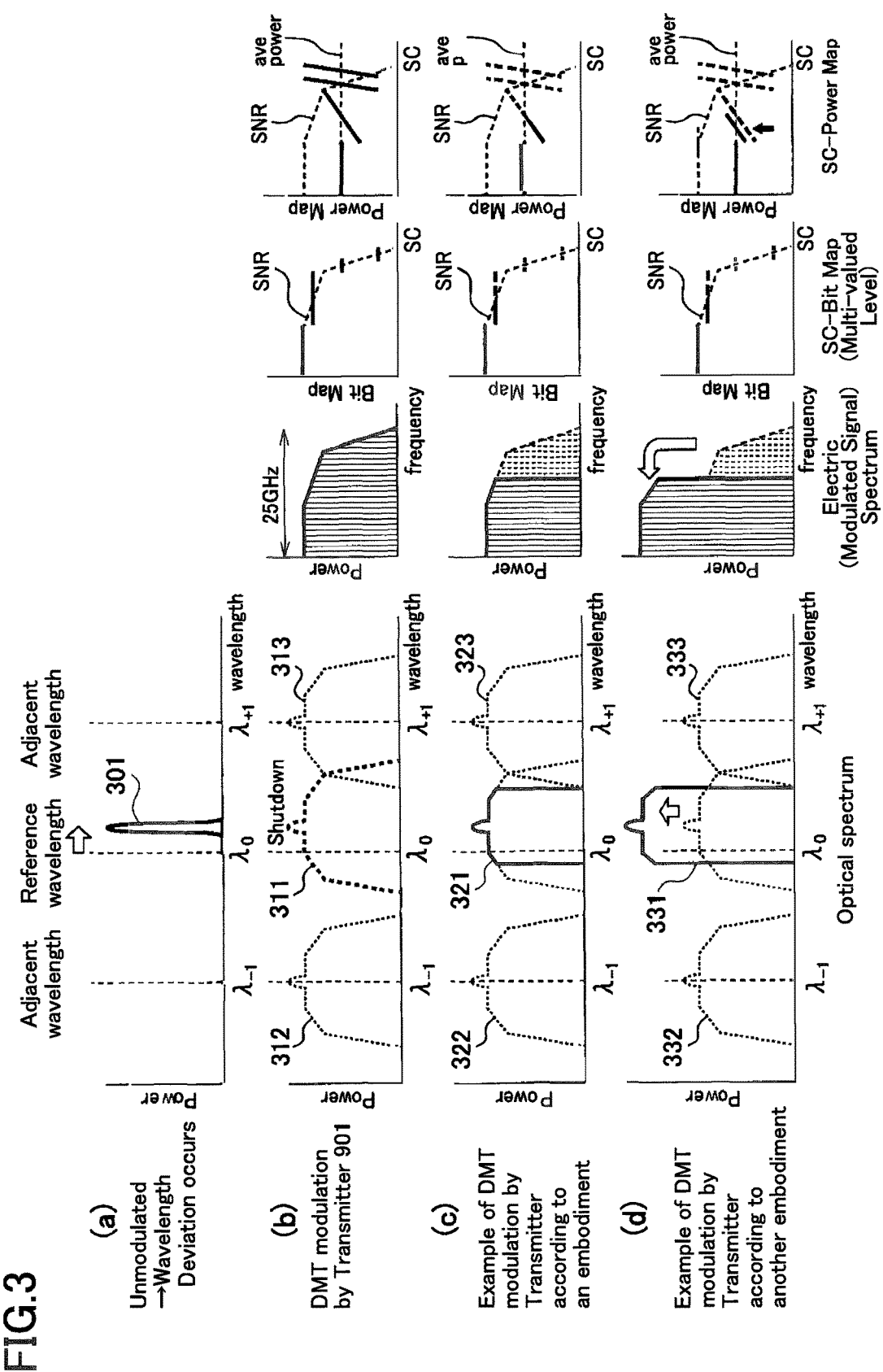

FIG.5

Default SC

| SC index | frequency [GHz] | validity |
|---|---|---|
| 1 | 0.100 | TRUE |
| 2 | 0.200 | TRUE |
| 3 | 0.300 | TRUE |
| ~ | | |
| 247 | 24.700 | TRUE |
| 248 | 24.800 | TRUE |
| 249 | 24.900 | TRUE |
| 250 | 25.000 | TRUE |

Maximum occupied bandwidth: 50.0 [GHz] (±25.0 [GHz])

Wavelength difference information: 0.2 [GHz]

⇨

SC to be used

| SC index | frequency [GHz] | validity |
|---|---|---|
| 1 | 0.100 | TRUE |
| 2 | 0.200 | TRUE |
| 3 | 0.300 | TRUE |
| ~ | | |
| 247 | 24.700 | TRUE |
| 248 | 24.800 | TRUE |
| 249 | 24.900 | False |
| 250 | 25.000 | False |

Sub-Carriers of 1 to 248 (max 24.8 GHz) are used

FIG.8

SC Information before wavelength deviation

| SC | frequency [GHz] | validity | SN [dB] | Multi-valued Level | Power [dB] |
|---|---|---|---|---|---|
| 1 | 0.100 | TRUE | 28.0 | 6 | −0.50 |
| 2 | 0.200 | TRUE | 28.0 | 6 | −0.50 |
| 3 | 0.300 | TRUE | 27.8 | 6 | −0.30 |
| ~ | | | | | |
| 247 | 24.700 | TRUE | 16.0 | 3 | +0.50 |
| 248 | 24.800 | TRUE | 15.7 | 2 | −0.30 |
| 249 | 24.900 | TRUE | 15.3 | 2 | ±0.00 |
| 250 | 25.000 | TRUE | 15.0 | 2 | +0.30 |
| total | − | − | − | 1000 | ±0.00 |

SC Information after compensation

| SC | frequency [GHz] | validity | SN [dB] | Multi-valued Level | Power [dB] Before compensation | Power [dB] After compensation |
|---|---|---|---|---|---|---|
| 1 | 0.100 | TRUE | 28.0 | 6 | −0.50 | −0.47 |
| 2 | 0.200 | TRUE | 28.0 | 6 | −0.50 | −0.47 |
| 3 | 0.300 | TRUE | 27.9 | 6 | −0.30 | −0.27 |
| ~ | | | | | | |
| 247 | 24.700 | TRUE | 16.0 | 3 | +0.50 | +0.53 |
| 248 | 24.800 | TRUE | 15.7 | 2 | ±0.00 | +0.03 |
| 249 | 24.900 | FALSE | 15.3 | − | − | − |
| 250 | 25.000 | FALSE | 15.0 | − | − | − |
| total | − | − | − | 996 | −0.03 | ±0.00 |

$10 \times \log_{10}(248/250)$

FIG.10

SC Information before wavelength deviation

| SC | frequency [GHz] | validity | SN [dB] | Multi-valued Level | Power [dB] |
|---|---|---|---|---|---|
| 1 | 0.100 | TRUE | 28.0 | 6 | −0.50 |
| 2 | 0.200 | TRUE | 28.0 | 6 | −0.50 |
| 3 | 0.300 | TRUE | 27.8 | 6 | −0.30 |
| ~ | | | | | |
| 247 | 24.700 | TRUE | 16.0 | 3 | +0.50 |
| 248 | 24.800 | TRUE | 15.7 | 2 | −0.30 |
| 249 | 24.900 | TRUE | 15.3 | 2 | ±0.00 |
| 250 | 25.000 | TRUE | 15.0 | 2 | +0.30 |
| total | − | − | − | 1000 | ±0.00 |

SC Information after compensation

| SC | frequency [GHz] | validity | SN [dB] | Multi-valued Level | Power [dB] Before compensation | Power [dB] After compensation |
|---|---|---|---|---|---|---|
| 1 | 0.100 | TRUE | 28.0 | 7 | +0.50 | +0.53 |
| 2 | 0.200 | TRUE | 28.0 | 7 | +0.50 | +0.53 |
| 3 | 0.300 | TRUE | 27.8 | 7 | +0.70 | +0.73 |
| ~ | | | | | | |
| 247 | 24.700 | TRUE | 16.0 | 3 | +0.50 | +0.53 |
| 248 | 24.800 | TRUE | 15.7 | 2 | −0.30 | −0.27 |
| 249 | 24.900 | FALSE | 15.3 | − | − | − |
| 250 | 25.000 | FALSE | 15.0 | − | − | − |
| total | − | − | − | 1000 | −0.03 | ±0.00 |

$10 \times \log_{10}(248/250)$

FIG.14B

SC Information before wavelength deviation

| SC | frequency [GHz] | validity | SN [dB] | Multi-valued Level | Power [dB] |
|---|---|---|---|---|---|
| 1 | 0.100 | TRUE | 28.0 | 6 | −0.50 |
| 2 | 0.200 | TRUE | 28.0 | 6 | −0.50 |
| ~ | | | | | |
| 150 | 15.000 | TRUE | 24.4 | 4 | −0.30 |
| 151 | 15.100 | TRUE | 24.2 | 4 | +0.20 |
| ~ | | | | | |
| 249 | 24.900 | TRUE | 15.3 | 2 | ±0.00 |
| 250 | 25.000 | TRUE | 15.0 | 2 | +0.30 |
| total | − | − | − | 1000 | ±0.00 |

SC Information after compensation

| SC | frequency [GHz] | validity | SN [dB] | Multi-valued Level | Power [dB] Before compensation | Power [dB] After compensation |
|---|---|---|---|---|---|---|
| 1 | 0.100 | TRUE | 28.0 | 6 | −0.50 | −0.45 |
| 2 | 0.200 | TRUE | 28.0 | 6 | −0.50 | −0.45 |
| ~ | | | | | | |
| 150 | 15.000 | TRUE | 24.4 | 4 | −0.30 | −0.25 |
| 151 | 15.100 | FALSE | 24.2 | − | − | − |
| ~ | | | | | | |
| 249 | 24.900 | FALSE | 15.3 | − | − | − |
| 250 | 25.000 | FALSE | 15.0 | − | − | − |
| total | − | − | − | 720 | −1.67 + α | −1.67 |

Perform Power Map compensation within range of SC to be used (to calculate amount of compensation by DRV easily)

α: Total Power Map Value deviated because of SC reduction $-1.67 = 10 \times \text{Log}_{10}(150/250)$

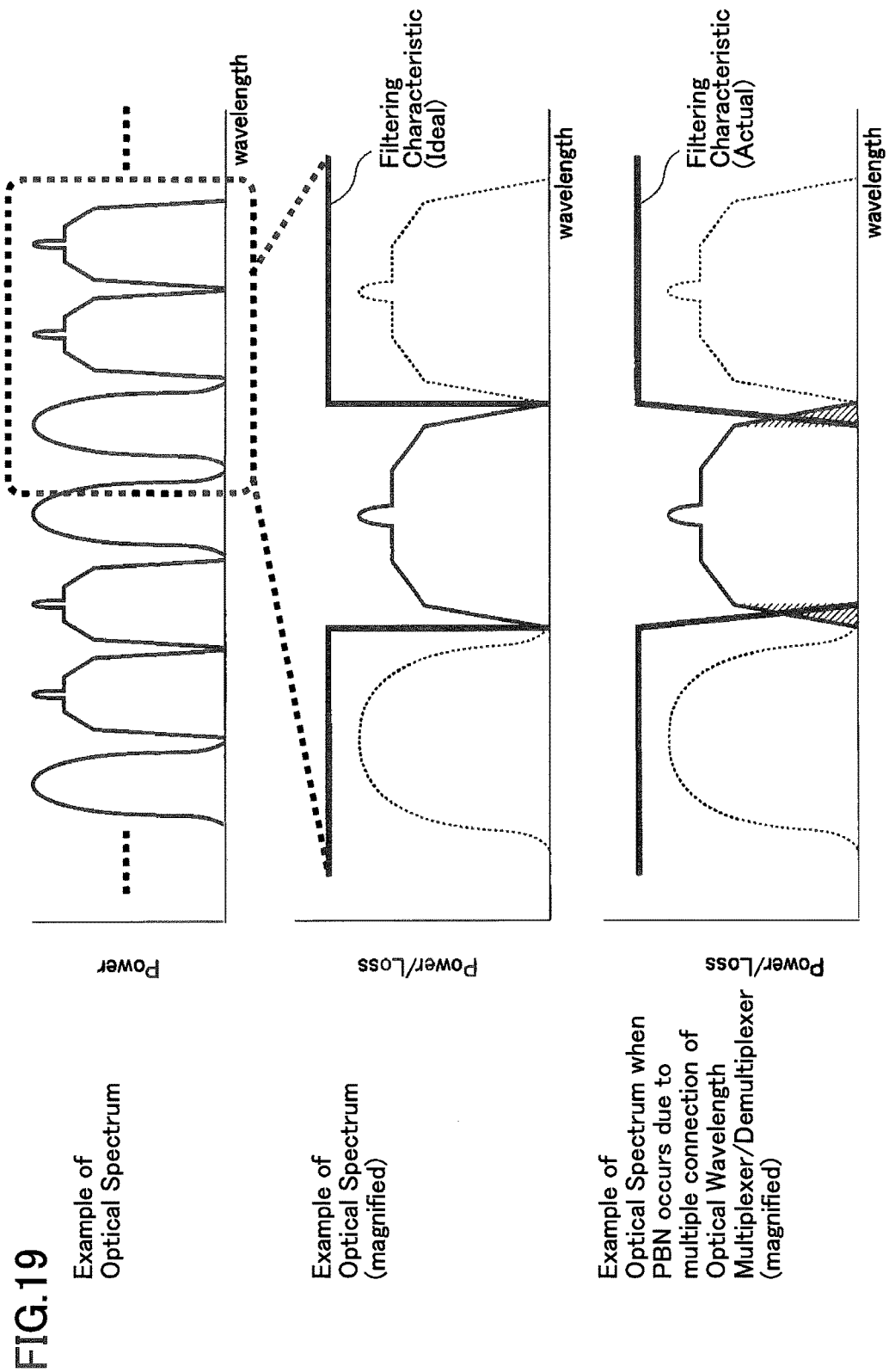

OPTICAL TRANSMITTER AND OPTICAL TRANSMITTING METHOD

CROSS-REFERENCE TO RELATED APPLICATION

This application is based on and claims priority to Japanese Patent Application No. 2017-196181, filed on Oct. 6, 2017, the entire contents of which are incorporated herein by reference.

FIELD

The embodiments discussed herein relate to an optical transmitter and an optical transmitting method.

BACKGROUND

As one of optical transmission techniques, discrete multi-tone (DMT) modulation, which is a type of orthogonal frequency-division multiplexing (OFDM), is known (see Patent Document 1, for example). In this technique, by configuring, for each subcarrier, the number of bits to be transmitted by using a corresponding subcarrier, in accordance with a signal-to-noise ratio (may also referred to as an S/N ratio or SNR) of an electrical signal corresponding to an optical signal received by an optical receiver, high-speed optical transmission is realized in accordance with transmission characteristics.

In addition, there is a need for applying the DMT modulation to wavelength-division multiplexing (WDM), because the DMT modulation has high efficiency of frequency utilization and high cost advantage. By applying the DMT modulation to the WDM, high-speed optical communication is realized.

Incidentally, regarding a light source including a laser diode, since a wavelength of light emitted by the light source is highly dependent on temperature, the temperature of the light source is controlled to be constant regardless of variation of optical output power and the like emitted from the light source, by using a temperature controlling element such as a thermoelectric cooler (TEC).

However, in the WDM, multiple signals having different wavelengths are densely multiplexed. Accordingly, if a wavelength of light emitted from a light source deviates from a wavelength as a reference (hereinafter referred to as a "reference wavelength"), a signal to be transmitted may be overlapped with another signal having adjacent wavelength, and a signal characteristic may degrade.

The following is reference document:
[Patent Document 1] United States Patent Application Publication No. 2014/0099115

SUMMARY

In one aspect, an optical transmitter includes: a light source; a wavelength detecting unit configured to detect a wavelength of light emitted from the light source; a wavelength difference information generating unit configured to generate wavelength difference information representing a wavelength difference between a predetermined reference wavelength and the wavelength of the light detected by the wavelength detecting unit; a subcarrier count determination unit configured to determine, as a subcarrier count, a number of subcarriers to be used, based on the wavelength difference indicated by the wavelength difference information; a multi-valued level determination unit configured to determine, for each of the subcarriers, a multi-valued level which is a number of bits transmitted by a corresponding subcarrier of the subcarriers; a modulated signal generating unit configured to generate a modulated signal by modulating the subcarriers such that each of the subcarriers has the determined multi-valued level; a modulator configured to output an optical transmission signal generated by modulating the light emitted from the light source based on the modulated signal; and a driver circuit configured to output the modulated signal generated by the modulated signal generating unit to the modulator.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 1A is a block diagram of an optical transmitter related to an optical transmitter according to embodiments of the present disclosure;

FIG. 1B is a more detailed diagram of the optical transmitter illustrated in FIG. 1A;

FIG. 1C is a diagram illustrating a concept of DMT modulation;

FIG. 3 is a diagram illustrating an overview of an optical transmitter according to the embodiments of the present disclosure;

FIG. 5 is a diagram illustrating a process performed by a subcarrier count determination unit illustrated in FIG. 4A;

FIG. 8 is a diagram illustrating a process performed by a power map determination unit illustrated in FIG. 7A;

FIG. 10 is a diagram illustrating a process performed by a bit/power map determination unit illustrated in FIG. 9A;

FIG. 14B is a diagram illustrating a process performed by the bit/power map determination unit illustrated in FIG. 11A;

FIG. 19 is a diagram illustrating an operation of the optical transmitter in the optical communication system illustrated in FIG. 18.

DESCRIPTION OF EMBODIMENT

Figure 2A:
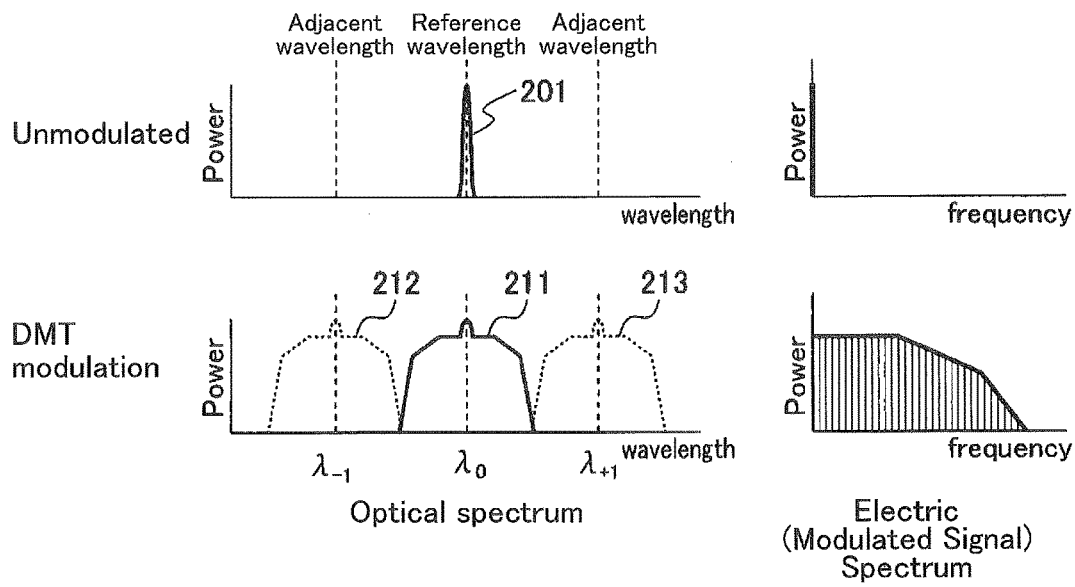
FIG. 2A is a diagram illustrating a state in which a wavelength of light emitted from a laser diode in FIG. 1B coincides with a reference wavelength.

Hereinafter, an optical transmitter and an optical transmitting method according to embodiments will be described with reference to the drawings. Note that a technical scope of the present invention is not limited to the embodiments.
<Configuration and Function of Related Optical Transmitter>

FIG. 1A is a block diagram of an optical transmitter related to an optical transmitter according to embodiments of the present disclosure. FIG. 1B is a more detailed diagram of the optical transmitter illustrated in FIG. 1A. FIG. 1C is a diagram illustrating a concept of DMT modulation.

An optical communication system 900 includes the optical transmitter 901, an optical receiver 902, and an optical transmission path 903 which is an optical fiber for example. The optical transmitter 901 modulates input data received from an input operation circuit (not illustrated), converts the modulated input data into an optical signal, and outputs the optical signal to the optical transmission path 903. The optical receiver 902 converts the optical signal that is input from the optical transmission path 903 into an electric signal, demodulates the electric signal, and outputs the demodulated electric signal to an output operation circuit (not illustrated).

The optical transmitter 901 includes an electric signal input circuit (may also be referred to as a "SERDES/FEC") 911, a transmission DMT engine circuit 912 (labeled as "DMT Engine" or "DMT" in the drawings), an IFFT circuit 913 (labeled as "IFFT" in the drawings), a DAC circuit 914 (labeled as "DAC" in the drawings), a driver circuit 915 (labeled as "DRV" in the drawings), and a TOSA 916. The electric signal input circuit 911 converts a parallel signal received from the input operation circuit (not illustrated) into a serial signal, generates an electric transmission signal by applying an FEC (Forward Error Correction) operation to the serial signal, and outputs the electric transmission signal to the transmission DMT engine circuit 912.

The transmission DMT engine circuit 912 applies DMT modulation to the electric transmission signal received from the electric signal input circuit 911, and outputs the DMT modulated signal to the IFFT circuit 913. For example, the transmission DMT engine circuit 912 may determine the number of bits to be transmitted by each subcarrier (multi-valued level) based on the water-pouring theorem. For example, in a case in which a minimum frequency of a subcarrier is 0.1 GHz and the number of subcarriers is 256, data transmission of 102.4 Gbps is realized by setting a multi-valued level of each subcarrier to 4.

In another example, the transmission DMT engine circuit 912 may determine a multi-valued level of each subcarrier based on a frequency characteristic of the optical communication system 900. In this case, as illustrated in FIG. 1C, the transmission DMT engine circuit 912 transmits an OFDM signal having constant optical output power to the optical receiver 902 through the optical transmission path 903, and acquires an SNR for each subcarrier. Next, based on the acquired SNR, the transmission DMT engine circuit 912 determines a pre-emphasis amount which may also be referred to as a power map, and also determines a multi-valued level of each subcarrier based on the water-pouring theorem.

The IFFT circuit 913 converts the signal received from the transmission DMT engine circuit 912 by performing IFFT (inverse fast Fourier transform), and outputs the converted signal to the DAC circuit 914. The DAC circuit 914 converts the signal received from the IFFT circuit 913 into an analog signal by performing digital-analog conversion, and outputs the converted analog signal to the driver circuit 915. The driver circuit 915 amplifies the signal received from the DAC circuit 914, and outputs the amplified signal to the TOSA 916. The TOSA 916 converts the signal (electric signal) received from the driver circuit 915 into an optical signal, and outputs the optical signal to the optical transmission path 903.

The optical receiver 902 includes an ROSA 921, an ADC circuit 922, an FFT circuit 923, a reception DMT engine circuit 924, and an electric signal output circuit (may also be referred to as a "FEC/SERDES") 925. The ROSA 921 converts an optical signal received from the optical transmission path 903 into an electric signal, and outputs the electric signal to the ADC circuit 922. The ADC circuit 922 converts the electric signal received from the ROSA 921 to a digital signal by performing an analog-digital conversion, and outputs the obtained digital signal to the FFT circuit 923. The FFT circuit 923 converts the signal received from the ADC circuit 922 by performing FFT (fast Fourier transform), and outputs the converted signal to the reception DMT engine circuit 924.

The reception DMT engine circuit 924 applies DMT demodulation to the signal received from the FFT circuit 923, and outputs the demodulated signal to the electric signal output circuit 925. The electric signal output circuit 925 applies an FEC operation to the signal received from the reception DMT engine circuit 924, and converts the signal (of a serial format), to which an FEC operation is applied, into an electric reception signal of a parallel format, and outputs the electric reception signal to the output operation circuit (not illustrated).

The TOSA 916 is a tunable light source, and includes a laser diode 930 (labeled as "Laser" in the drawings), a modulator 931 (labeled as "Mod." in the drawings), a splitter 932, a first photodiode 933 (labeled as "PD" in the drawings), a second photodiode 934 (labeled as "PD" in the drawings), an etalon filter 935 (labeled as "Etalon" in the drawings), a wavelength control circuit 936 (labeled as "Tunable Controller" in the drawings), and a thermoelectric cooler 937 (labeled as "TEC" in the drawings). The TOSA 916 also includes a wavelength offset detecting circuit 938 (labeled as "Wavelength offset det." in the drawings), and a shutter 939 (labeled as "Shutter/Amplifier" in the drawings).

The laser diode 930 emits light of a wavelength in accordance with a wavelength control signal entered from the wavelength control circuit 936. The modulator 931 modulates light emitted from the laser diode 930 based on an electric signal received from the driver circuit 915, and outputs the modulated light (in the present disclosure, an operation of modulating/converting light using an electric signal received from the driver circuit 915 is also referred to as a "DMT modulation"). The splitter 932 splits light output from the modulator 931, and outputs the split light to the shutter 939, the first photodiode 933, and the etalon filter 935. The first photodiode 933 outputs an electric signal in accordance with power of light entered from the splitter 932, to the wavelength control circuit 936. The second photodiode 934 outputs an electric signal in accordance with power of light that is transmitted from the splitter 932 via the etalon filter 935, to the wavelength control circuit 936. The etalon filter 935 is a filtering element that transmits light having a given reference wavelength.

The wavelength control circuit 936 controls the laser diode 930 such that a wavelength of light emitted from the laser diode 930 coincides with the reference wavelength, based on electric signals received from the first photodiode 933 and the second photodiode 934. The wavelength control circuit 936 also controls the thermoelectric cooler 937 such that a temperature of the laser diode 930 remains constant based on the electric signals received from the first photodiode 933 and the second photodiode 934. Further, the wavelength control circuit 936 outputs, to the wavelength offset detecting circuit 938, a ratio signal indicating a ratio of an electric signal received from the first photodiode 933 to an electric signal received from the second photodiode 934. The thermoelectric cooler 937 is a small-size cooling device including, for example, a Peltier element. The wavelength offset detecting circuit 938 detects that a wavelength of light emitted from the laser diode 930 deviates from the reference wavelength by a predetermined threshold or more, based on a ratio indicated by the ratio signal. In a case in which the wavelength offset detecting circuit 938 detects that a wavelength of light emitted from the laser diode 930 deviates from the reference wavelength by a predetermined threshold or more, the shutter 939 blocks light emitted from the laser diode 930.

Figure 2B:
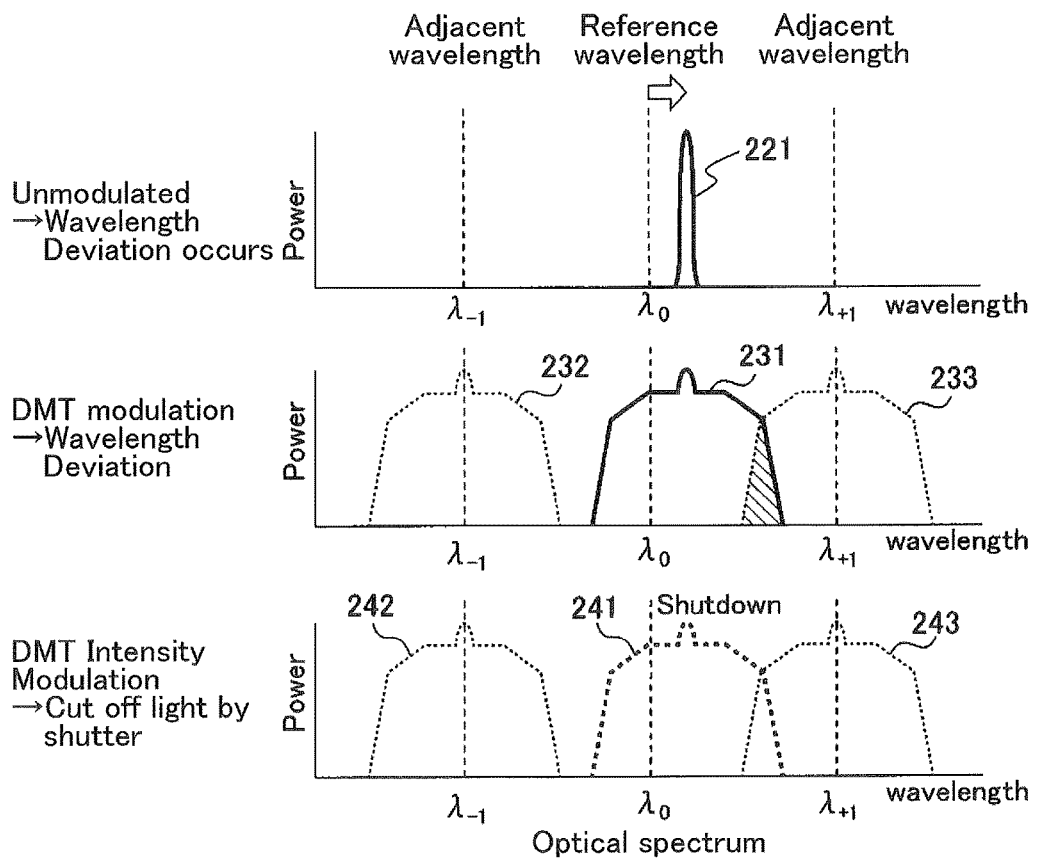
FIG. 2B is a diagram illustrating a state in which a wavelength of light emitted from the laser diode in FIG. 1B deviates from the reference wavelength.

FIG. 2A is a diagram illustrating a state in which a wavelength of light emitted from the laser diode 930 coincides with the reference wavelength. FIG. 2B is a diagram illustrating a state in which a wavelength of light emitted from the laser diode 930 deviates from the reference wavelength.

In a case in which a wavelength of light emitted from the laser diode 930 coincides with the reference wavelength, a spectrum 201 of the light emitted from the laser diode 930 coincides with the reference wavelength $\lambda_0$, and a center of a spectrum 211 of the light after DMT modulation also coincides with the reference wavelength $\lambda_0$. When the center of the spectrum 211 of the light after DMT modulation coincides with the reference wavelength $\lambda_0$, the spectrum 211 does not overlap with a spectrum 212 of light obtained by performing DMT modulation of light of an adjacent wavelength $\lambda_{-1}$. Also, the spectrum 211 does not overlap with a spectrum 213 of light obtained by performing DMT modulation of light of an adjacent wavelength $\lambda_{+1}$.

Conversely, in a case in which a wavelength of light emitted from the laser diode 930 deviates from the reference wavelength, a spectrum 221 of the light emitted from the laser diode 930 deviates from the reference wavelength $\lambda_0$, and a center of a spectrum 231 of the light after DMT modulation also deviates from the reference wavelength $\lambda_0$. When the center of the spectrum 231 of the light after DMT modulation deviates from the reference wavelength $\lambda_0$, the spectrum 231 overlaps with a spectrum 232 of light obtained by performing DMT modulation of light of an adjacent wavelength $\lambda_{-1}$, or with a spectrum 233 of light obtained by performing DMT modulation of light of an adjacent wavelength $\lambda_{+1}$. If the spectrum 231 overlaps with the spectrum 232 or 233 because a wavelength of the light emitted from the laser diode 930 has deviated from the reference wavelength by the predetermined threshold or more, the shutter 939 blocks the light emitted from the laser diode 930.

As the optical communication system 900 is configured such that the shutter 939 blocks light emitted from the laser diode 930 when a wavelength of the light has deviated from the reference wavelength by the predetermined threshold or more, the laser diode 930 can keep emitting the light and a temperature in the TOSA 916 can remain constant.

However, as the optical transmitter 901 needs to be equipped with the shutter 939 in the optical communication system 900, a manufacturing cost of the optical transmitter 901 increases. Further, in the optical communication system 900, as the shutter 939 is inserted, the optical transmitter 901 outputs light emitted from the laser diode 930 via the shutter 939. Accordingly, loss increases and optical output power decreases.

<Overview of Optical Transmitter According to Embodiments>

FIG. 3 is a diagram illustrating an overview of an optical transmitter according to the embodiments of the present disclosure. A diagram (a) in FIG. 3 is a diagram illustrating an example of a spectrum of light before DMT modulation, and a diagram (b) in FIG. 3 is a diagram illustrating DMT modulation performed by the optical transmitter 901. A diagram (c) in FIG. 3 is a diagram illustrating an example of DMT modulation performed by the optical transmitter according to one embodiment. A diagram (d) in FIG. 3 is a diagram illustrating an example of DMT modulation performed by the optical transmitter according to another embodiment.

The optical transmitter 901 assigns a multi-valued level to each subcarrier in accordance with an SNR. That is, the optical transmitter 901 assigns a large multi-valued level to a low frequency region having a high SNR, and assigns a small multi-valued level to a high frequency region having a low SNR. The optical transmitter 901 also determines a pre-emphasis amount such that optical output power of each frequency range having the same multi-valued level becomes equal. In the optical transmitter 901, if a spectrum 311, obtained by applying DMT modulation to light emitted from the laser diode 930, overlaps with an adjacent spectrum 313 because a wavelength 301 of the light (before DMT modulation) has deviated from the reference wavelength $\lambda_0$, the optical transmitter 901 blocks the light emitted from the laser diode 930 by the shutter 939.

In the optical transmitter according to an embodiment of the present disclosure, as illustrated in the diagram (c) in FIG. 3, if a spectrum 321 of light emitted from a laser diode overlaps with an adjacent spectrum 323 because a wavelength 301 of the light has deviated from the reference wavelength $\lambda_0$, a subcarrier (or subcarriers) corresponding to a region of the spectrum 321 overlapping with the spectrum 323 is reduced (the subcarrier(s) is/are not used for signal transmission). By reducing the subcarrier corresponding to the region overlapping with the spectrum 323, a case in which the spectrum 323 overlaps with an adjacent spectrum becomes less likely to occur.

Further, the optical transmitter according to another embodiment of the present disclosure may determine a pre-emphasis amount of each subcarrier, such that output power corresponding to the reduced subcarrier(s) is compensated. That is, the optical transmitter according to the another embodiment may determine a pre-emphasis amount of each subcarrier, such that electric power of a modulated signal when the subcarrier(s) is/are reduced (when the subcarrier(s) is/are not used for signal transmission) becomes equal to that of the modulated signal when subcarriers as many as the default subcarrier count are used. The default subcarrier count mentioned here is the number of subcarriers as a reference. For example, the default subcarrier count corresponds to the number of subcarriers to be used when a spectrum of light emitted from a laser diode of the optical transmitter coincides with the reference wavelength $\lambda_0$.

Further, the optical transmitter according to yet another embodiment of the present disclosure may determine a multi-valued level of each subcarrier, such that the number of bits having been assigned to the reduced subcarrier(s) is compensated. That is, the optical transmitter according to the yet another embodiment may determine the number of bits to be transmitted by each subcarrier, such that the total number of bits to be transmitted by subcarriers when at least one of the subcarriers is reduced becomes equal to the total number of bits to be transmitted when subcarriers as many as the default subcarrier count are used.

Further, in addition to the functions of the optical transmitter described above with reference to the diagram (c) in FIG. 3, the optical transmitter according to still yet another embodiment is configured to increase electric power of every subcarrier such that electric power of a modulated signal when the subcarrier(s) is/are reduced becomes equal to that of the modulated signal when subcarriers as many as the default subcarrier count are used, as illustrated in the diagram (d) in FIG. 3. That is, when it is determined that the number of subcarriers to be used is decreased, the optical transmitter according to still yet another embodiment may increase electric power of every subcarrier such that electric power of a modulated signal becomes equal to that of the modulated signal when subcarriers as many as the default subcarrier count are used.

<Configuration and Function of Light Source Including an Optical Transmitter According to a First Embodiment>

Figure 4A:
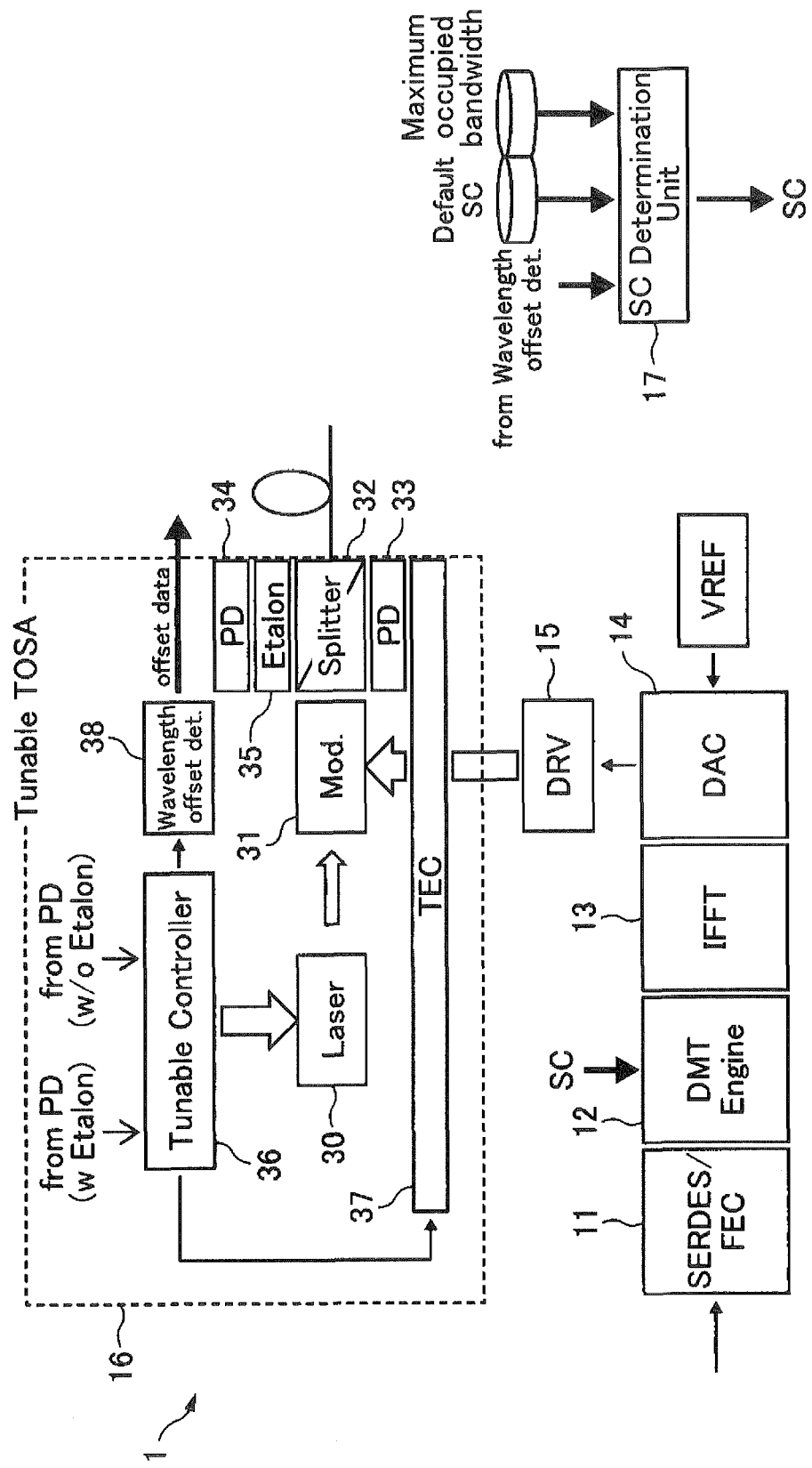
FIG. 4A is a block diagram of an optical transmitter according to a first embodiment.
Figure 4B:
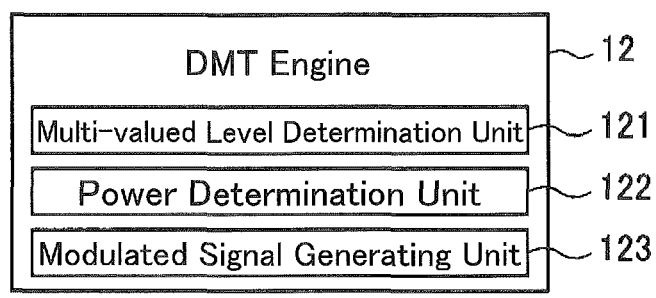
FIG. 4B is a block diagram of a transmission DMT engine circuit illustrated in FIG. 4A.

FIG. 4A is a block diagram of the optical transmitter according to a first embodiment, and FIG. 4B is a block diagram of a transmission DMT engine circuit illustrated in FIG. 4A.

The optical transmitter 1 includes an electric signal input circuit (may also be referred to as a "SERDES/FEC") 11, a transmission DMT engine circuit 12 (labeled as "DMT Engine" in the drawings), an IFFT circuit 13 (labeled as "IFFT" in the drawings), a DAC circuit 14 (labeled as "DAC" in the drawings), a driver circuit 15 (labeled as "DRV" in the drawings), a TOSA 16 (labeled as "Tunable TOSA" in the drawings), and a subcarrier count determination unit 17 (labeled as "SC Determination unit" in the drawings). Since configurations and functions of the electric signal input circuit 11, the IFFT circuit 13, the DAC circuit 14, and the driver circuit 15 are similar to the configurations and the functions of the electric signal input circuit 911, the IFFT circuit 913, the DAC circuit 914, and the driver circuit 915 respectively, detailed descriptions of the electric signal input circuit 11, the IFFT circuit 13, the DAC circuit 14, and the driver circuit 15 are omitted.

The TOSA 16 is different from the TOSA 916 in that the TOSA 16 does not include an element corresponding to the shutter 939. Configurations and functions of other elements (a laser diode 30 (labeled as "Laser" in the drawings), a modulator 31 (labeled as "Mod." in the drawings), a splitter 32, a first photodiode 33 (labeled as "PD" in the drawings), a second photodiode 34 (labeled as "PD" in the drawings), an etalon filter 35 (labeled as "Etalon" in the drawings), a wavelength control circuit 36 (labeled as "Tunable Controller" in the drawings), and a thermoelectric cooler 37 (labeled as "TEC" in the drawings)) are similar to those of corresponding elements in the TOSA 916 (from the laser diode 930 to the thermoelectric cooler 937); accordingly, detailed descriptions of these elements are omitted.

The wavelength offset detecting circuit 38 acts as a wavelength difference information generating unit configured to generate wavelength difference information representing a difference between a predetermined reference wavelength and a wavelength of light emitted from the laser diode 30 as a light source. Specifically, to the wavelength offset detecting circuit 38, a ratio signal indicating a ratio of an electric signal received from the first photodiode 33 to an electric signal received from the second photodiode 34 is entered from the wavelength control circuit 36.

The first photodiode 33 and the second photodiode 34 act as a wavelength detecting unit for detecting a wavelength of light emitted from the laser diode 30 as the light source. The wavelength offset detecting circuit 38 generates wavelength difference information representing the difference between the reference wavelength and a wavelength of the light emitted from the laser diode 30, based on a ratio indicated by the ratio signal.

The subcarrier count determination unit 17 is a semiconductor circuit, for example. The subcarrier count determination unit 17 determines the number of subcarriers which is less than the default subcarrier count, based on a wavelength difference indicated by the wavelength difference information, the default subcarrier count, and a maximum occupied bandwidth. The default subcarrier count is the number of subcarriers as a reference, such as 250. The maximum occupied bandwidth is a maximum bandwidth that can be occupied by a signal to which DMT modulation is applied.

FIG. 5 is a diagram illustrating a process performed by the subcarrier count determination unit 17. In an example illustrated in FIG. 5, the default subcarrier count is 250, a wavelength difference indicated by the wavelength difference information generated by the wavelength offset detecting circuit 38 is 0.2 [GHz], and the maximum occupied bandwidth is 50 [GHz].

The subcarrier count determination unit 17 determines that two subcarriers are to be reduced, which corresponds to a difference between a wavelength of light emitted by the laser diode 30 and the reference wavelength (=0.2 [GHz]). That is, the subcarrier count determination unit 17 determines that the number of subcarriers to be used (may also be referred to as a "subcarrier count") is 248, which is a remainder obtained by subtracting 2 from 250.

The transmission DMT engine circuit 12 includes a multi-valued level determination unit 121, a power determination unit 122, and a modulated signal generating unit 123. The multi-valued level determination unit 121 determines the number of bits that is transmitted by each subcarrier, which is a multi-valued level. The power determination unit 122 determines electric power of each subcarrier, which is a pre-emphasis amount. As a method of determining a multi-valued level by the multi-valued level determination unit 121 and a method of determining a pre-emphasis amount by the power determination unit 122 are similar to the methods of determining a multi-valued level and a pre-emphasis amount performed by the transmission DMT engine circuit 912, detailed description of the methods will be omitted. The modulated signal generating unit 123 generates a modulated signal including subcarriers modulated so as to have the determined multi-valued level and so as to have the determined electric power.

<Advantageous Effect of the Optical Transmitter According to the First Embodiment>

As the optical transmitter 1 reduces the number of subcarriers to be used, based on a difference between the reference wavelength and a wavelength of light emitted from the laser diode 30, a case in which modulated lights adjacent in frequency domain (or wavelength domain) are overlapped with each other becomes less likely to occur.

<Configuration and Function of Light Source Including an Optical Transmitter According to a Second Embodiment>

Figure 6:
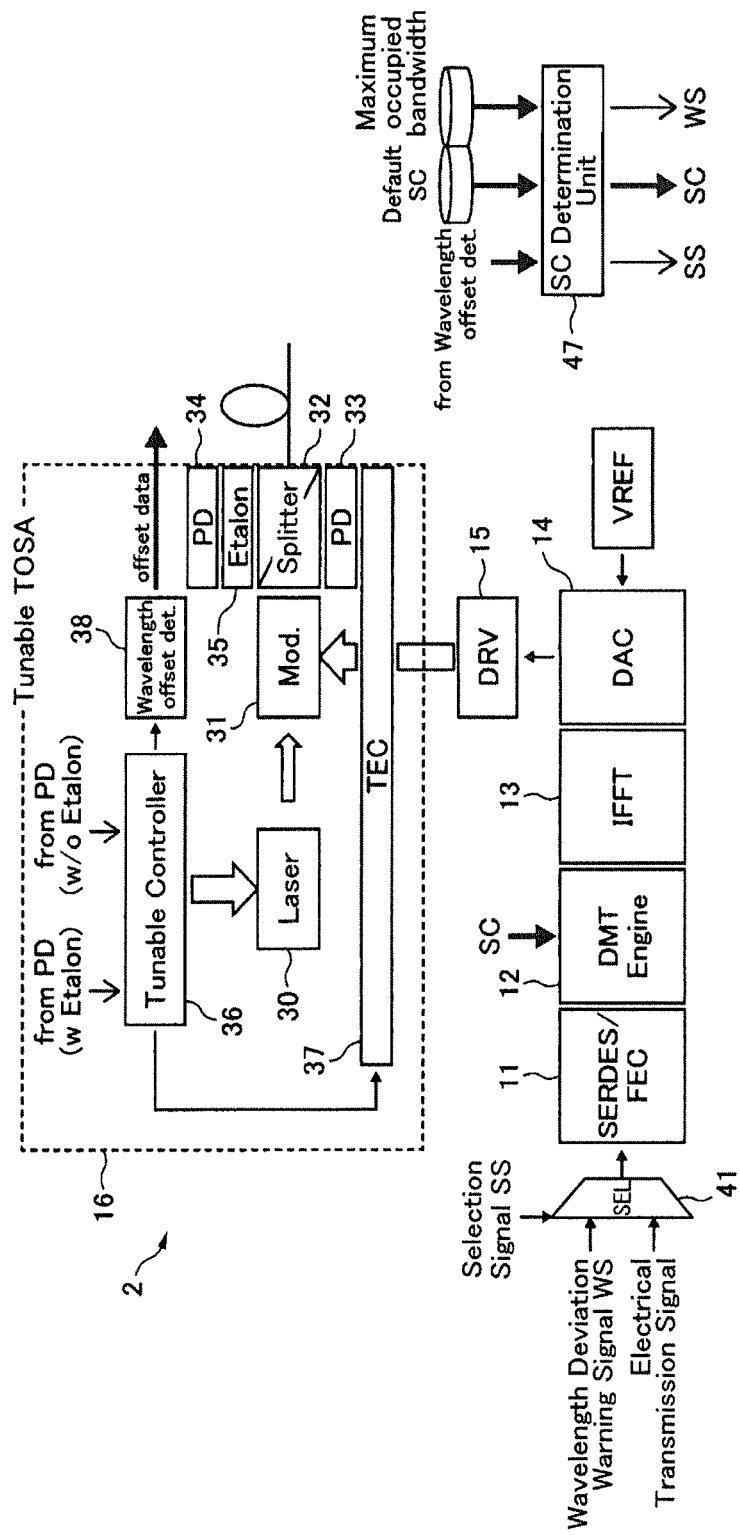
FIG. 6 is a block diagram of an optical transmitter according to a second embodiment.

FIG. 6 is a block diagram of an optical transmitter according to a second embodiment.

An optical transmitter 2 is different from the optical transmitter 1 in that the optical transmitter 2 includes a selection circuit (SEL) 41. The optical transmitter 2 is also different from the optical transmitter 1 in that the optical transmitter 2 includes a subcarrier count determination unit 47 instead of the subcarrier count determination unit 17. Since configurations and functions of each component in the optical transmitter 2 other than the selection circuit 41 and the subcarrier count determination unit 47 are similar to that of the optical transmitter 1, detailed descriptions of these components are omitted.

The selection circuit 41 changes a signal to be output in accordance with a selection signal SS, from an electric transmission signal entered by an input operation circuit (not illustrated) to a wavelength deviation warning signal WS entered by the subcarrier count determination unit 47. The warning signal WS output from the selection circuit is optically transmitted from the TOSA 16 to an optical receiver (not illustrated).

The subcarrier count determination unit 47 determines the number of subcarriers. In addition, when a wavelength difference indicated by the wavelength difference information is not less than a predetermined threshold, the subcarrier count determination unit 47 outputs the selection signal SS and the warning signal WS.

<Advantageous Effect of the Optical Transmitter According to the Second Embodiment>

As the optical transmitter 2 transmits a warning signal to the optical receiver when a wavelength difference indicated by the wavelength difference information is not less than a predetermined threshold, the optical transmitter 2 can send a notification to the optical receiver that a wavelength of light emitted from the laser diode 30 has deviated.

The above described optical transmitter 2 transmits the warning signal WS to the optical receiver when a wavelength difference indicated by the wavelength difference information is not less than a predetermined threshold. However, in another embodiment, the optical transmitter may transmit a high-priority signal when a wavelength difference indicated by the wavelength difference information is not less than a predetermined threshold. For example, the optical transmitter may be configured such that the subcarrier count determination unit 47 outputs the warning signal WS to the input operation circuit (not illustrated) and the input operation circuit selects and outputs a high-priority signal when the warning signal WS is received.

<Configuration and Function of Light Source Including an Optical Transmitter According to a Third Embodiment>

Figure 7A:
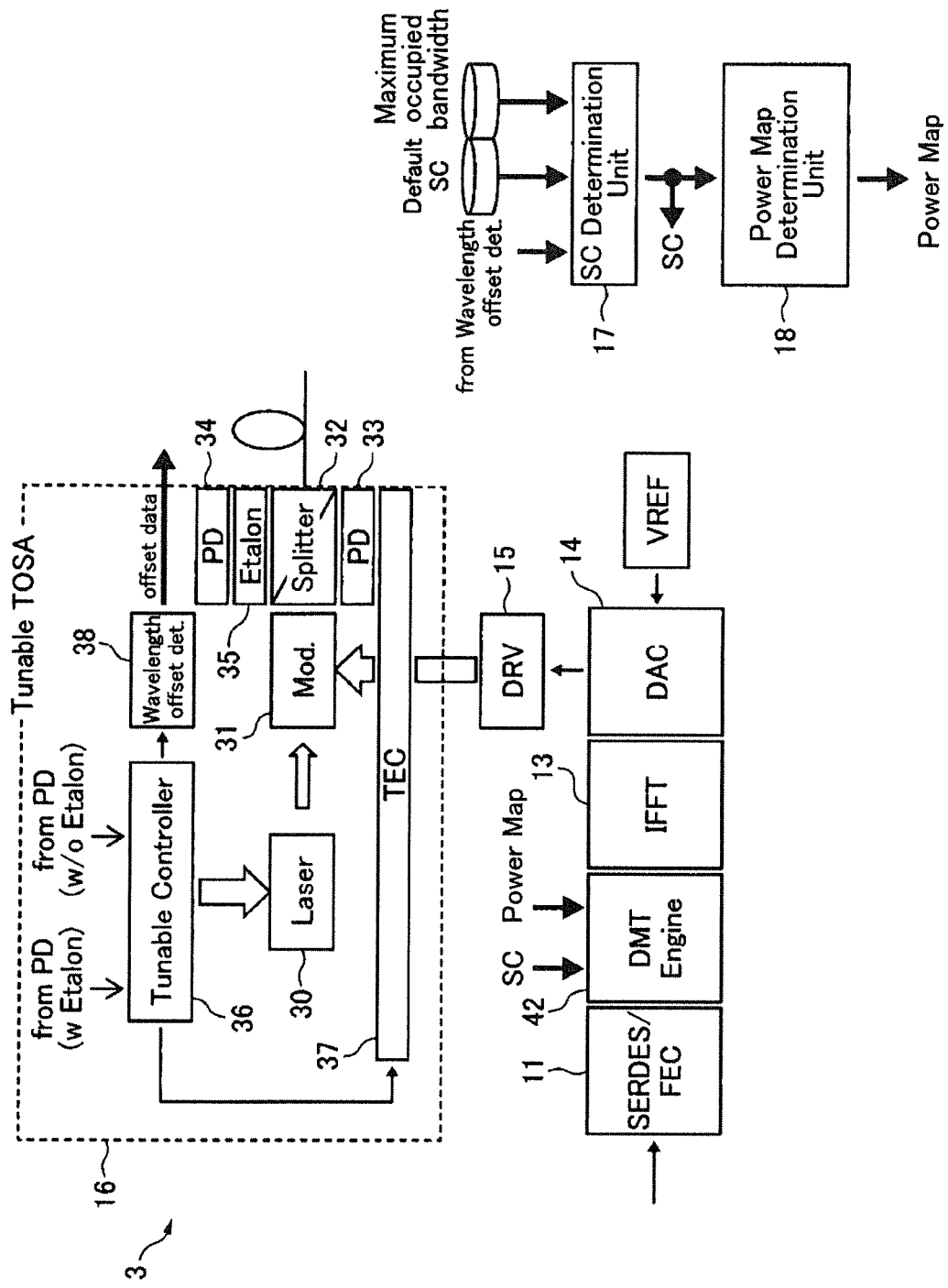
FIG. 7A is a block diagram of an optical transmitter according to a third embodiment.
Figure 7B:
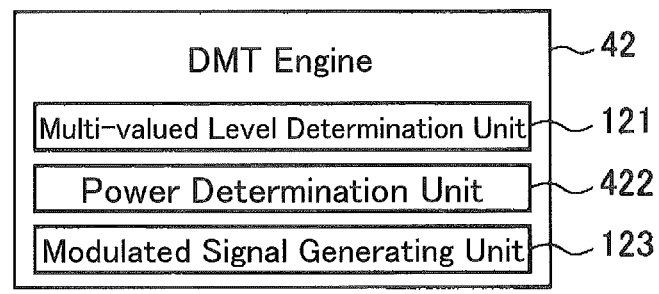
FIG. 7B is a block diagram of a transmission DMT engine circuit illustrated in FIG. 7A.

FIG. 7A is a block diagram of an optical transmitter according to a third embodiment, and FIG. 7B is a block diagram of a transmission DMT engine circuit illustrated in FIG. 7A.

An optical transmitter 3 is different from the optical transmitter 1 in that the optical transmitter 3 includes a power map determination unit 18. The optical transmitter 3 is also different from the optical transmitter 1 in that the optical transmitter 3 includes a transmission DMT engine circuit 42 instead of the transmission DMT engine circuit 12. Since configurations and functions of each component in the optical transmitter 3 other than the power map determination unit 18 and the transmission DMT engine circuit 42 are similar to that of the optical transmitter 1, detailed descriptions of these components are omitted.

The power map determination unit 18 is a semiconductor circuit, for example. The power map determination unit 18 determines a pre-emphasis amount of each subcarrier by using the number of subcarriers determined by the subcarrier count determination unit 17, such that electric power of a modulated signal becomes equal to that of a modulated signal before reducing the number of subcarriers. That is, the power map determination unit 18 determines a pre-emphasis amount of each subcarrier such that total electric power of an electric signal which is output from the driver circuit 15 to the modulator 31 does not change even if the number of subcarriers is reduced.

FIG. 8 is a diagram illustrating a process performed by the power map determination unit 18. In an example illustrated in FIG. 8, the default subcarrier count is 250, a wavelength difference indicated by the wavelength difference information generated by the wavelength offset detecting circuit 38 is 0.2 [GHz], and the maximum occupied bandwidth is 50 [GHz], which is similar to the example in FIG. 5.

The power map determination unit 18 compensates for deviation of a pre-emphasis amount that occurs because two subcarriers (249th and 250th subcarriers) are reduced. In the example illustrated in FIG. 8, as the total pre-emphasis amount before performing compensation is −0.03 [dB], a pre-emphasis amount of the 248th subcarrier is changed from 0.00 [dB] to +0.03 [dB], in order to compensate for the deviation of a pre-emphasis amount.

The transmission DMT engine circuit 42 is different from the transmission DMT engine circuit in that the transmission DMT engine circuit 42 includes the power determination unit 422 instead of the power determination unit 122. The power determination unit 422 determines a pre-emphasis amount which is input from the power map determination unit 18 as a pre-emphasis amount for generating a modulated signal.

<Advantageous Effect of the Optical Transmitter According to the Third Embodiment>

The optical transmitter 3 keeps total electric power of an electric signal which is output from the driver circuit 15 to the modulator 31 constant, by compensating a pre-emphasis amount such that total pre-emphasis amount does not change even if the number of subcarriers is reduced. By keeping total electric power of an electric signal which is output from the driver circuit 15 to the modulator constant, the optical transmitter 3 keeps an ambient temperature of the laser diode 30 constant even if the number of subcarriers is reduced, and thereby keeps a wavelength of light emitted from the laser diode 30 constant.

In the above description, the optical transmitter 3 is configured such that the power map determination unit 18 performs a process for compensating a pre-emphasis amount. However, in another embodiment, the power determination unit in the transmission DMT engine circuit may perform a process for compensating a pre-emphasis amount.

<Configuration and Function of Light Source Including an Optical Transmitter According to a Fourth Embodiment>

Figure 9A:
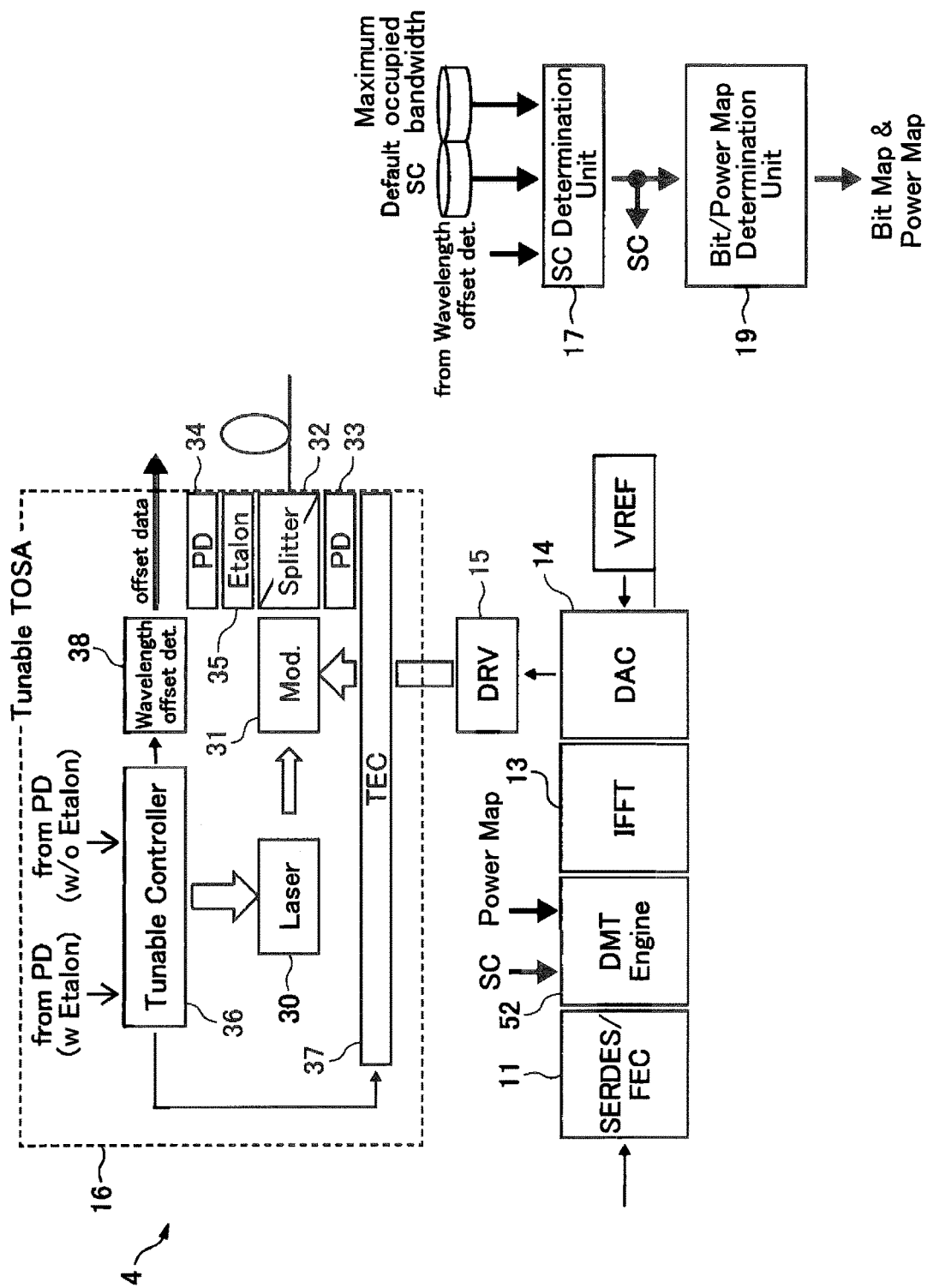
FIG. 9A is a block diagram of an optical transmitter according to a fourth embodiment.
Figure 9B:
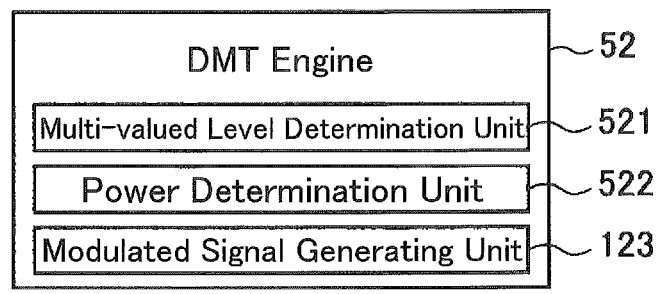
FIG. 9B is a block diagram of a transmission DMT engine circuit illustrated in FIG. 9A.

FIG. 9A is a block diagram of an optical transmitter according to a fourth embodiment, and FIG. 9B is a block diagram of a transmission DMT engine circuit illustrated in FIG. 9A.

An optical transmitter 4 is different from the optical transmitter 1 in that the optical transmitter 4 includes a bit/power map determination unit 19. The optical transmitter 4 is also different from the optical transmitter 1 in that the optical transmitter 4 includes a transmission DMT engine circuit 52 instead of the transmission DMT engine circuit 12. Since configurations and functions of each component in the optical transmitter 4 other than the bit/power map determination unit 19 and the transmission DMT engine circuit 52 are similar to that of the optical transmitter 1, detailed descriptions of these components are omitted.

The bit/power map determination unit 19 is a semiconductor circuit, for example. The bit/power map determination unit 19 determines a multi-valued level of each subcarrier by using the number of subcarriers (subcarrier count) determined by the subcarrier count determination unit 17, such that the total number of bits to be transmitted by as many subcarriers as the subcarrier count determined by the subcarrier count determination unit 17 becomes equal to the total number of bits to be transmitted by as many subcarriers as the default subcarrier count. The bit/power map determination unit 19 determines a multi-valued level of each subcarrier using the water-pouring theorem, for example.

The bit/power map determination unit 19 also determines a pre-emphasis amount of each subcarrier by using the number of subcarriers determined by the subcarrier count determination unit 17, such that electric power of a modulated signal becomes equal to that of a modulated signal before reducing the number of subcarriers. That is, the bit/power map determination unit 19 determines a pre-emphasis amount of each subcarrier such that total electric power of an electric signal which is output from the driver circuit 15 to the modulator 31 does not change even if the number of subcarriers is reduced.

FIG. 10 is a diagram illustrating a process performed by the bit/power map determination unit 19. In an example illustrated in FIG. 10, the default subcarrier count is 250, a wavelength difference indicated by the wavelength difference information generated by the wavelength offset detecting circuit 38 is 0.2 [GHz], and the maximum occupied bandwidth is 50 [GHz], which is similar to the example in FIG. 5 or FIG. 8.

Similar to the power map determination unit 18, the bit/power map determination unit 19 compensates for deviation of a pre-emphasis amount that occurs because two subcarriers (249th and 250th subcarriers) are reduced. In addition, the bit/power map determination unit 19 compensates for a decrease of the number of bits transmitted by subcarriers (a decrease of the multi-valued level) that is caused by a reduction of the two subcarriers (249th and 250th subcarriers). In the example illustrated in FIG. 10, a decrease amount of bits is 4 bits because a multi-valued level of each of the decreased subcarriers (249th and 250th subcarriers) is 2. Thus, the bit/power map determination unit 19 compensates for a decrease of these 4 bits. Specifically, the bit/power map determination unit 19 increments respective multi-valued levels of the 1st, 2nd, 3rd, and 4th subcarriers by 1, to compensate for the decrease of the 4 bits caused by a reduction of the two subcarriers (249th and 250th subcarriers).

The transmission DMT engine circuit 52 is different from the transmission DMT engine circuit 12 in that the transmission DMT engine circuit 52 includes the multi-valued level determination unit 521 and the power determination unit 522 instead of the multi-valued level determination unit 121 and the power determination unit 122. The multi-valued level determination unit 521 determines a multi-valued level which is input from the bit/power map determination unit 19 as a multi-valued level for generating a modulated signal. The power determination unit 522 determines a pre-emphasis amount which is input from the bit/power map determination unit 19 as a pre-emphasis amount for generating a modulated signal.

<Advantageous Effect of the Optical Transmitter According to the Fourth Embodiment>

The optical transmitter 4 avoids decrease of an amount of information capable of being transmitted, by adjusting a multi-valued level such that the total number of bits to be transmitted by subcarriers does not vary even if the number of subcarriers is reduced.

In the above description, the optical transmitter 4 is configured such that the bit/power map determination unit 19 performs a process for adjusting a multi-valued level and a pre-emphasis amount. However, in another embodiment, the transmission DMT engine circuit may perform a process for adjusting a multi-valued level and a pre-emphasis amount. That is, the multi-valued level determination unit in the transmission DMT engine circuit may perform a process for adjusting a multi-valued level and the power determination unit in the transmission DMT engine circuit may perform a process for adjusting a pre-emphasis amount.

<Configuration and Function of Light Source Including an Optical Transmitter According to a Fifth Embodiment>

Figure 11A:
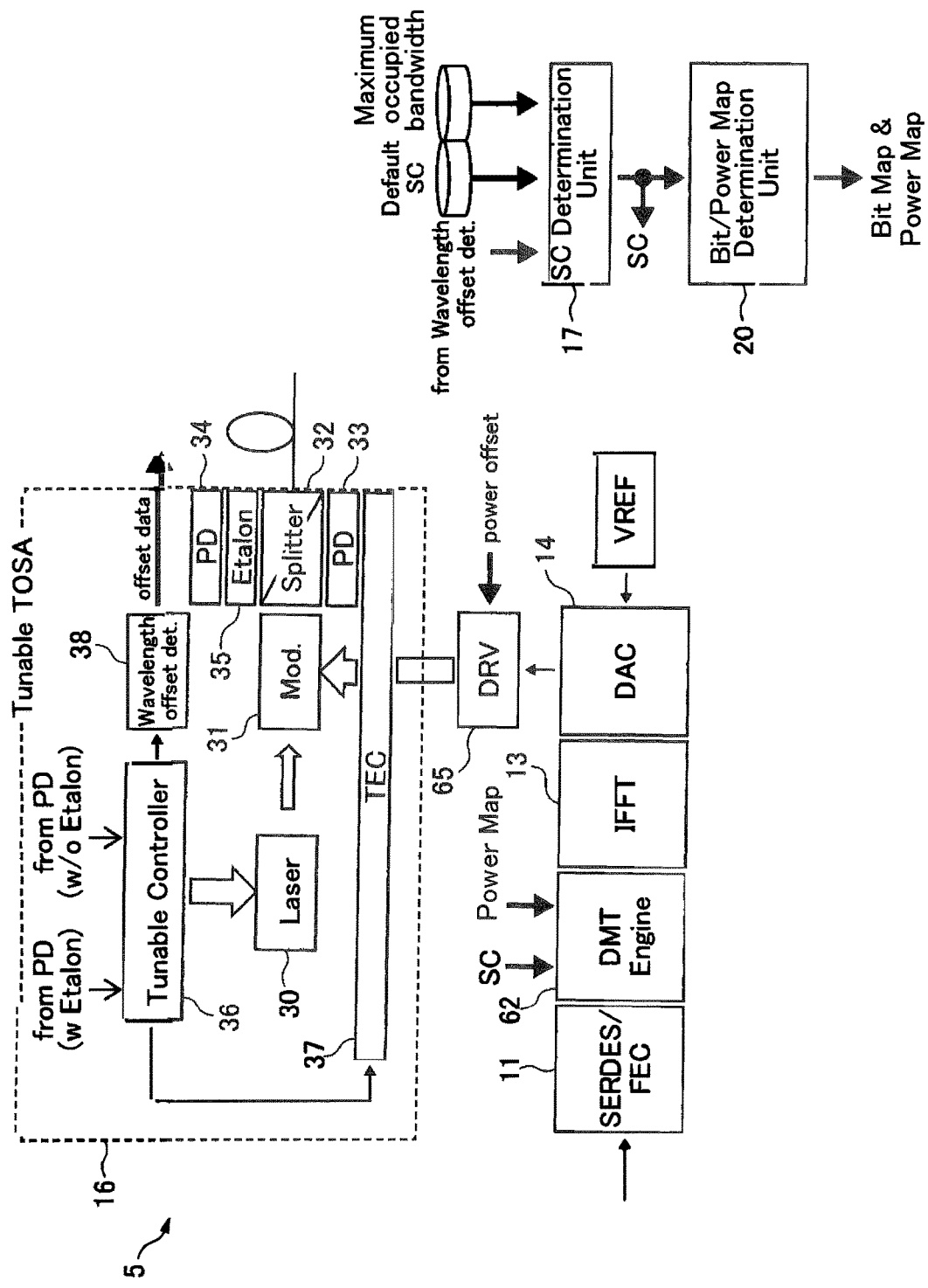
FIG. 11A is a block diagram of an optical transmitter according to a fifth embodiment.
Figure 11B:
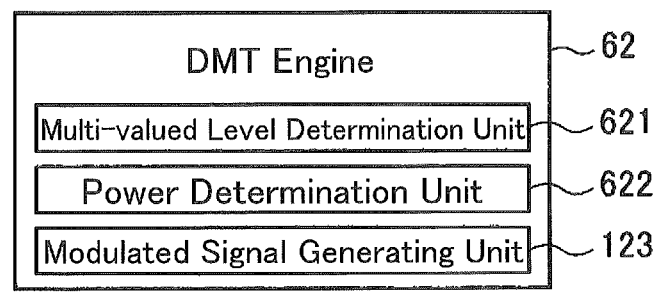
FIG. 11B is a block diagram of a transmission DMT engine circuit illustrated in FIG. 11A.

FIG. 11A is a block diagram of an optical transmitter according to a fifth embodiment, and FIG. 11B is a block diagram of a transmission DMT engine circuit illustrated in FIG. 11A.

An optical transmitter 5 is different from the optical transmitter 1 in that the optical transmitter 5 includes a bit/power map determination unit 20. The optical transmitter 5 is also different from the optical transmitter 1 in that the optical transmitter 5 includes a transmission DMT engine circuit 62 and a driver circuit 65 instead of the transmission DMT engine circuit 12 and the driver circuit 15. Since configurations and functions of each component in the optical transmitter 5 other than the bit/power map determination unit 20, the transmission DMT engine circuit 62, and the driver circuit 65 are similar to that of the optical transmitter 1, detailed descriptions of these components are omitted.

Figure 12:
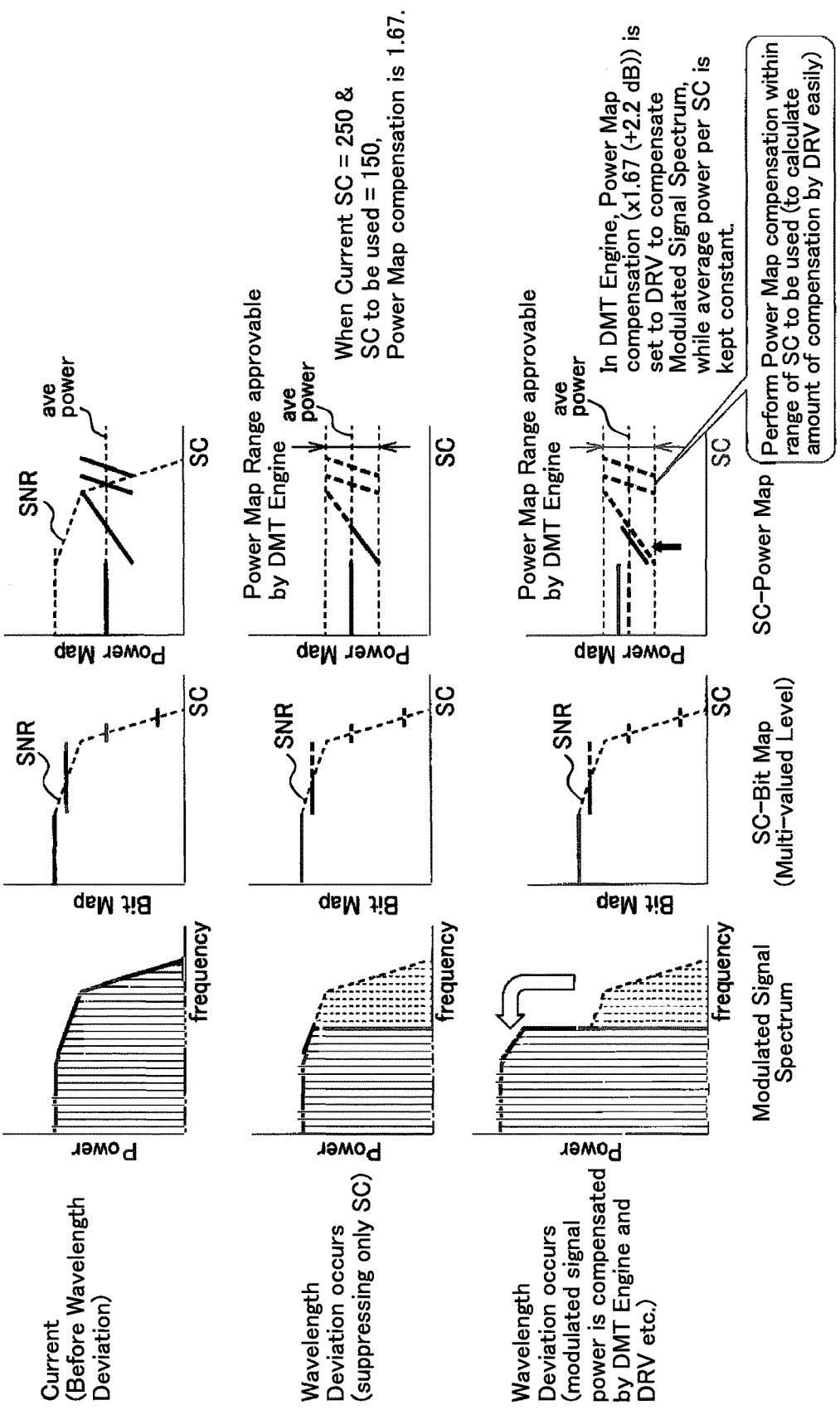
FIG. 12 is a diagram illustrating an operation of the optical transmitter illustrated in FIG. 11A.

FIG. 12 is a diagram illustrating an operation of the optical transmitter 5.

In the following description, an amount of diminution of power of an electric signal output from the driver circuit to the modulator, which is caused by a reduction of subcarriers, is referred to as a "power adjustment value". When a power adjustment value exceeds a predetermined threshold, the optical transmitter 5 increases power of all subcarriers to compensate for power corresponding to the power adjustment value.

The bit/power map determination unit 20 is a semiconductor circuit, for example. The bit/power map determination unit 20 determines a pre-emphasis amount of each subcarrier by using the number of subcarriers determined by the subcarrier count determination unit 17, such that electric power of a modulated signal becomes equal to that of a modulated signal before reducing the number of subcarriers.

The bit/power map determination unit 20 also determines a multi-valued level of each subcarrier by using the number of subcarriers determined by the subcarrier count determination unit 17, such that the total number of bits to be transmitted by as many subcarriers as the subcarrier count determined by the subcarrier count determination unit 17 becomes equal to the total number of bits to be transmitted by as many subcarriers as the default subcarrier count.

Figure 13:
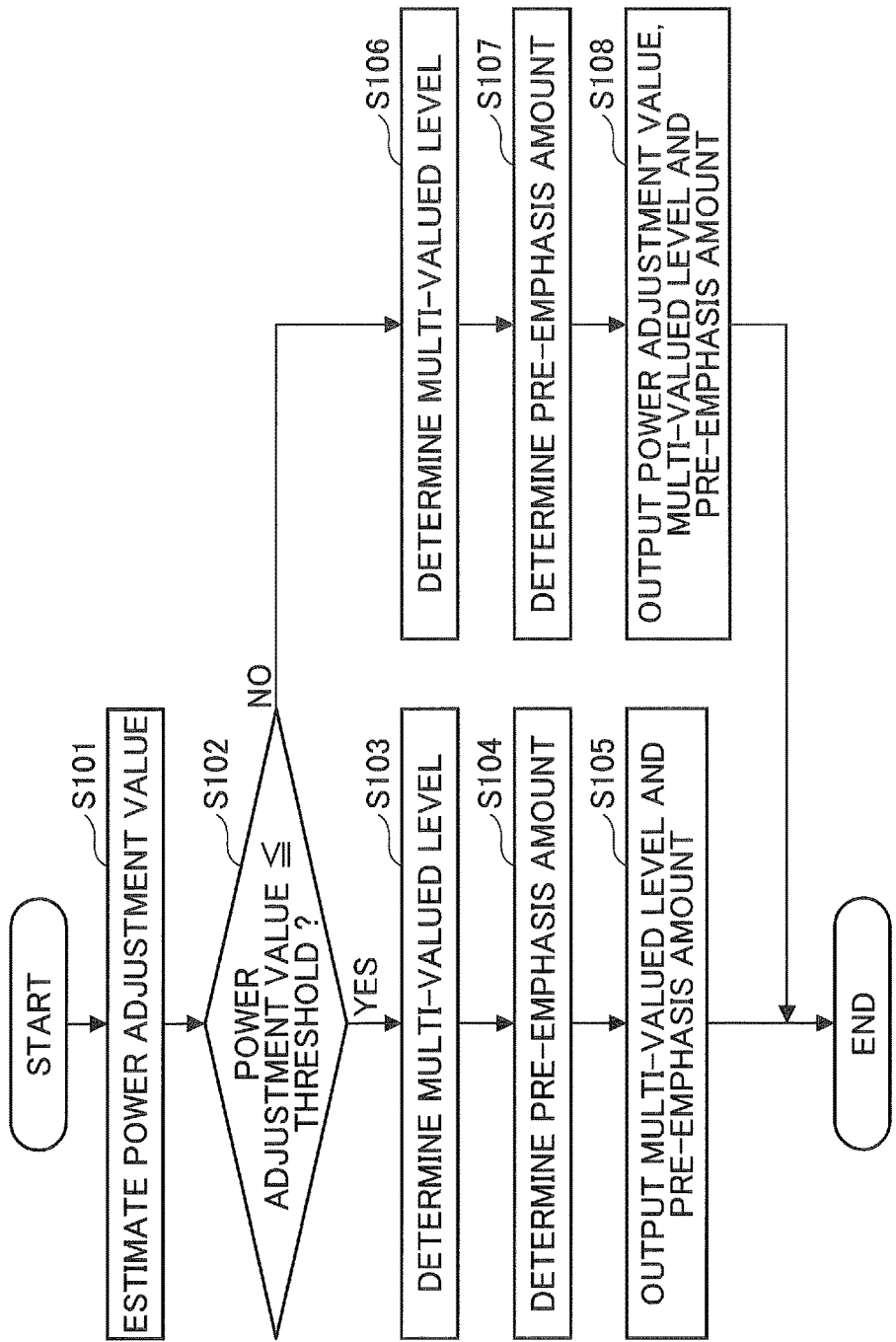
FIG. 13 is a flowchart illustrating a flow of a process performed by a bit/power map determination unit illustrated in FIG. 11A.

FIG. 13 is a flowchart illustrating a flow of a process performed by the bit/power map determination unit 20.

First, the bit/power map determination unit 20 estimates a power adjustment value (an amount of diminution of power of an electric signal output from the driver circuit 15 to the modulator 31, which is caused by a reduction of subcarriers) (S101). For example, in a case in which the default subcarrier count is 250 and in which the 249th and 250th subcarriers are to be reduced, the power adjustment value of this case is a sum of electric power of the 249th and 250th subcarriers. Further, in a case in which the default subcarrier count is 250 and in which the 151st to 250th subcarriers are to be reduced, the power adjustment value of this case is a sum of electric power of the 151st to 250th subcarriers. Note that the power adjustment value does not include a pre-emphasis amount of the subcarrier to be reduced.

Next, the bit/power map determination unit determines whether or not the power adjustment value estimated at S101 is not more than a predetermined threshold (S102). The threshold is determined based on whether electric power equal to the power adjustment value can be compensated or not by adjusting a pre-emphasis amount of each subcarrier by the bit/power map determination unit 20. For example, as in the case illustrated in FIG. 5, when the power adjustment value corresponds to a sum of electric power of the 249th and 250th subcarriers, electric power corresponding to the power adjustment value can be compensated by adjusting a pre-emphasis amount. On the other hand, when the power adjustment value corresponds to a sum of electric power of the 151st to 250th subcarriers, it is difficult to compensate for a decrease of electric power corresponding to the power adjustment value by adjusting a pre-emphasis amount.

If it is determined that the power adjustment value is not more than the predetermined threshold (S102—YES), the bit/power map determination unit 20 determines a multi-valued level of each subcarrier (S103). Similar to the bit/power map determination unit 19, the bit/power map determination unit 20 determines a multi-valued level of each subcarrier such that the total number of bits to be transmitted by as many subcarriers as the subcarrier count determined by the subcarrier count determination unit 17 becomes equal to the total number of bits to be transmitted by subcarriers before reducing the number of subcarriers.

Next, the bit/power map determination unit 20 determines a pre-emphasis amount of each subcarrier (S104). Similar to the bit/power map determination unit 19, the bit/power map determination unit 20 determines a pre-emphasis amount of each subcarrier such that electric power of a modulated signal becomes equal to that of a modulated signal before reducing the number of subcarriers.

Next, the bit/power map determination unit 20 outputs the multi-valued level of each subcarrier determined at S103 and a pre-emphasis amount of each subcarrier determined at S104, to the transmission DMT engine circuit 62 (S105).

If it is determined that the power adjustment value is more than the predetermined threshold (S102—NO), the bit/power map determination unit 20 determines a multi-valued level of each subcarrier (S106). The bit/power map determination unit 20 does not change a multi-valued level of each of the subcarriers which is not reduced. For example, in a case in which the default subcarrier count is 250 and in which the 151st to 250th subcarriers are to be reduced, the multi-valued levels of the 1st to 150th subcarriers after a reduction of the 151st to 250th subcarriers are not changed (remains the same) from the multi-valued levels before the reduction of the 151st to 250th subcarriers.

Next, the bit/power map determination unit 20 determines a pre-emphasis amount of each subcarrier (S107). The bit/power map determination unit 20 determines a pre-emphasis amount of each of the subcarriers which are not reduced, such that pre-emphasis amounts of the subcarriers to be reduced can be compensated. For example, when the 151st to 250th subcarriers are to be reduced, pre-emphasis amounts of the 1st to 150th subcarriers are determined such that pre-emphasis amounts of the 151st to 250th subcarriers can be compensated.

Next, the bit/power map determination unit 20 outputs the power adjustment value estimated at S101 to the driver circuit 65, and outputs the multi-valued level of each subcarrier determined at S106 and a pre-emphasis amount of each subcarrier determined at S107, to the transmission DMT engine circuit 62 (S108).

Figure 14A:
FIG. 14A is a diagram illustrating a process performed by a subcarrier count determination unit illustrated in FIG. 11A.

FIG. 14A is a diagram illustrating a process performed by the subcarrier count determination unit 17, and FIG. 14B is a diagram illustrating a process performed by the bit/power map determination unit 20. In an example illustrated in FIGS. 14A and 14B, the default subcarrier count is 250, a wavelength difference indicated by the wavelength difference information generated by the wavelength offset detecting circuit 38 is 10.0 [GHz], and the maximum occupied bandwidth is 50 [GHz].

The subcarrier count determination unit 17 determines to reduce 100 subcarriers, which correspond to 10.0 [GHz] of wavelength difference between a wavelength of light emitted by the laser diode 30 and the reference wavelength. That is, the subcarrier count determination unit 17 determines that the number of subcarriers to be used is 150, which is a remainder obtained by subtracting 100 from 250.

When the bit/power map determination unit 20 determines that the power adjustment value estimated at S101 is more than the predetermined threshold, the bit/power map determination unit 20 executes steps of S106 to S108. In addition, the bit/power map determination unit 20 compensates a decrease of the number of bits transmitted by subcarriers (a decrease of the multi-valued level) that is caused by a reduction of the two subcarriers (249th and 250th subcarriers). In the example illustrated in FIGS. 14A and 14B, since the 151st to 250th subcarriers are reduced, multi-valued levels of the 1st to 150th subcarriers are set to multi-valued levels of the 1st to 150th subcarriers. Also, the bit/power map determination unit 20 determines a pre-emphasis amount of each of the 1st to 150th subcarriers. The bit/power map determination unit 20 determines a pre-emphasis amount of each of the subcarriers which are not reduced, such that pre-emphasis amounts of the subcarriers to be reduced can be compensated.

The transmission DMT engine circuit 62 is different from the transmission DMT engine circuit 12 in that the transmission DMT engine circuit 62 includes the multi-valued level determination unit 621 and the power determination unit 622 instead of the multi-valued level determination unit 121 and the power determination unit 122. The multi-valued level determination unit 621 determines a multi-valued level which is input from the bit/power map determination unit 20 as a multi-valued level for generating a modulated signal. The power determination unit 622 determines a pre-emphasis amount which is input from the bit/power map determination unit 20 as a pre-emphasis amount for generating a modulated signal.

When the power adjustment value is entered to the driver circuit 65, the driver circuit 65 increases electric power of every subcarrier such that electric power corresponding to the power adjustment value can be compensated.

<Advantageous Effect of the Optical Transmitter According to the Fifth Embodiment>

The optical transmitter 5 avoids decrease of an amount of information capable of being transmitted, by adjusting a multi-valued level (compensating for a decrease of a multi-valued level) such that the total number of bits to be transmitted by subcarriers does not vary even if the number of subcarriers is reduced.

In the above description, the optical transmitter 5 is configured such that the bit/power map determination unit 20 performs a process for adjusting a multi-valued level and a pre-emphasis amount. However, in another embodiment, the transmission DMT engine circuit may perform a process for adjusting a multi-valued level and a pre-emphasis amount. That is, the multi-valued level determination unit in the transmission DMT engine circuit may perform a process for adjusting a multi-valued level and the power determination unit in the transmission DMT engine circuit may perform a process for adjusting a pre-emphasis amount.

<Configuration and Function of Light Source Including an Optical Transmitter According to a Sixth Embodiment>

Figure 15:
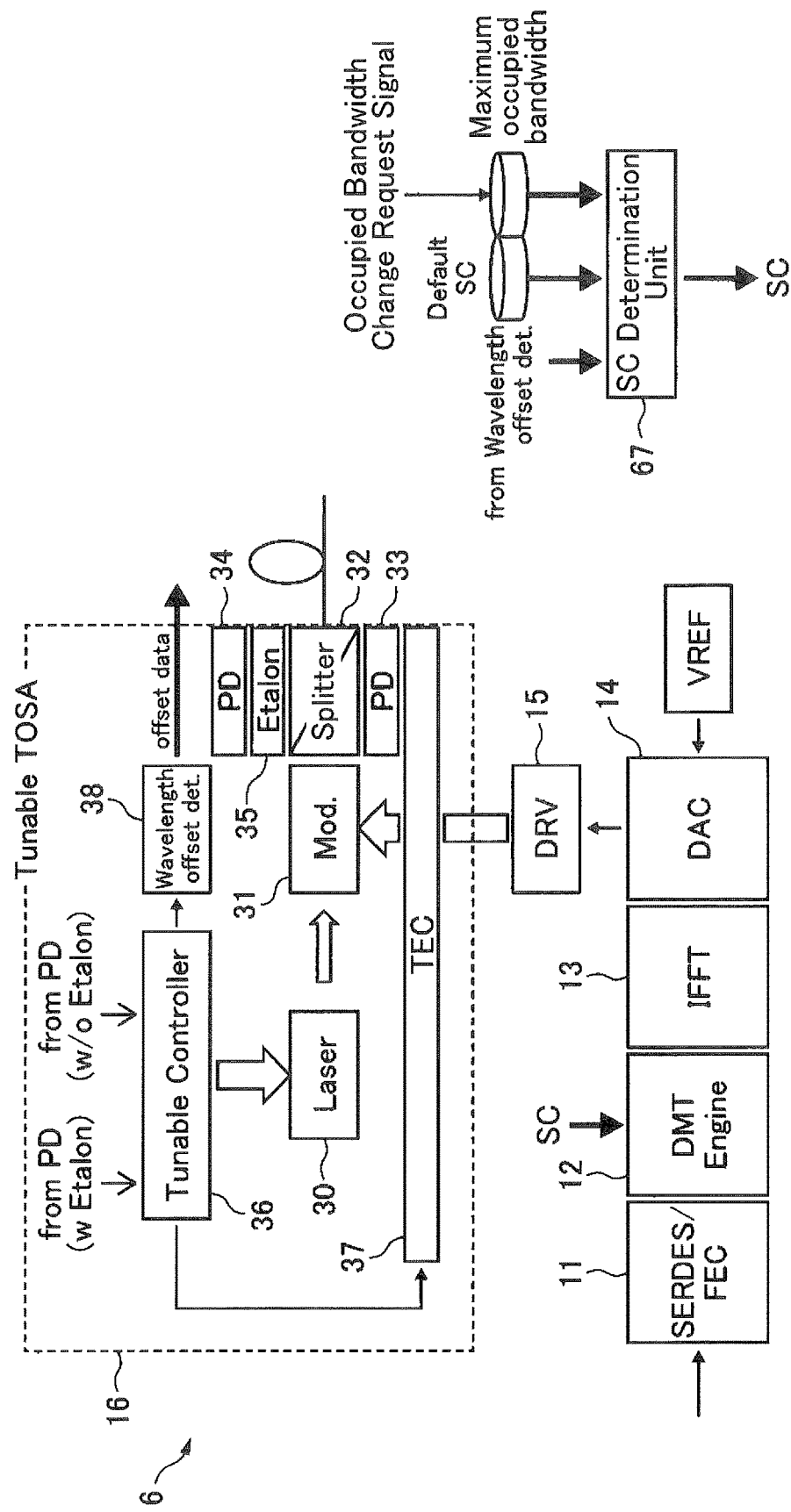
FIG. 15 is a block diagram of an optical transmitter according to a sixth embodiment.

FIG. 15 is a block diagram of an optical transmitter according to a sixth embodiment.

An optical transmitter 6 is different from the optical transmitter 1 in that the optical transmitter 6 includes a subcarrier count determination unit 67 instead of the subcarrier count determination unit 17. Since configurations and functions of each component in the optical transmitter 6 other than the subcarrier count determination unit 67 are similar to that of the optical transmitter 1, detailed descriptions of these components are omitted.

When an occupied bandwidth change request signal for instructing to change a bandwidth capable of assigning a subcarrier is entered to the subcarrier count determination unit 67, the subcarrier count determination unit 67 reduces the number of subcarriers. The occupied bandwidth change request signal may also include a bandwidth capable of assigning a subcarrier after changing the number of subcarriers.

Figure 16:
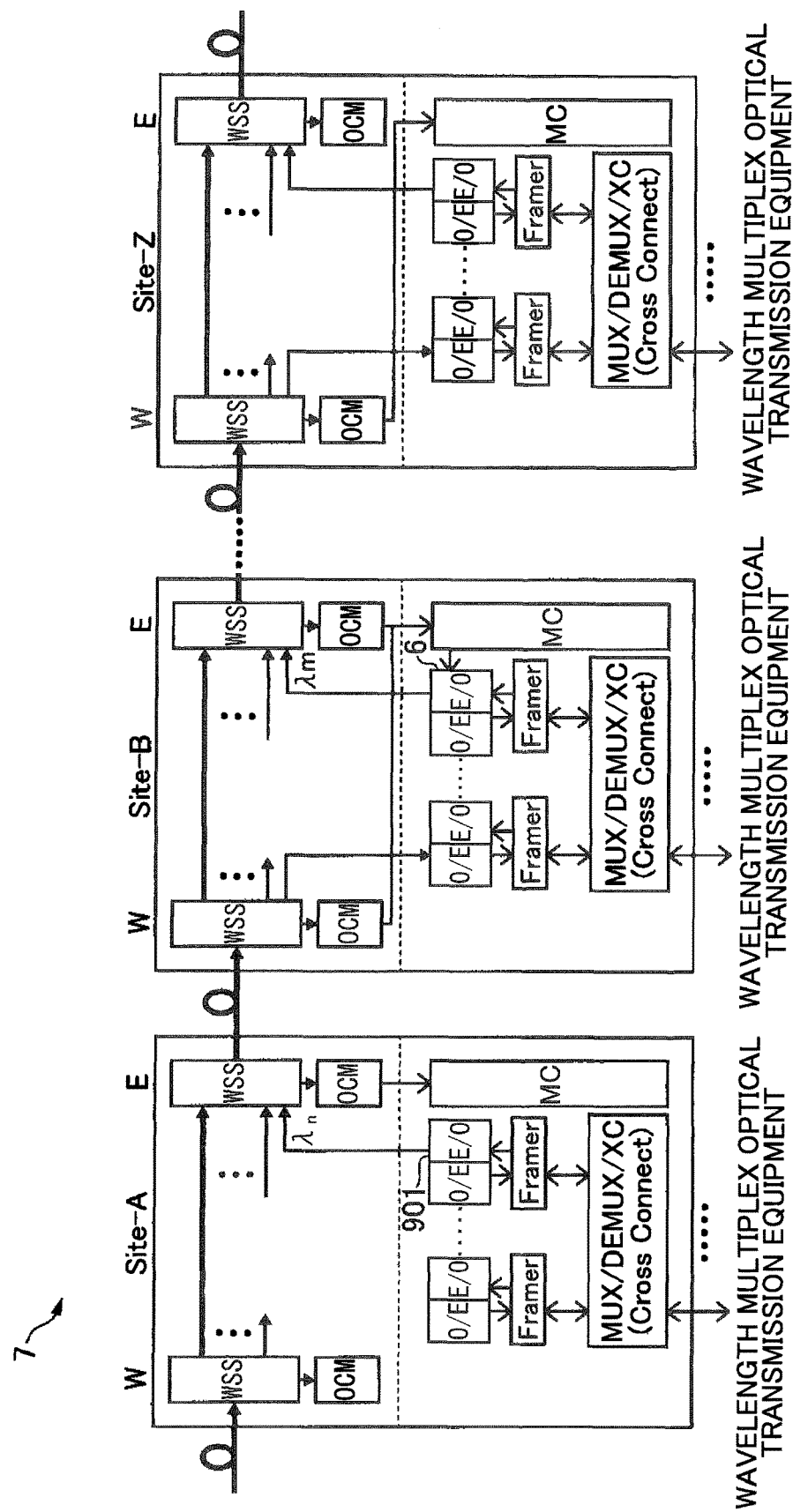
FIG. 16 is a diagram illustrating an example of an optical communication system employing the optical transmitter illustrated in FIG. 15.

FIG. 16 is a diagram illustrating an example of an optical communication system employing the optical transmitter 6.

An optical communication system 7 includes multiple optical transmission equipment Site-A to Site-Z for forming a linear network and performing wavelength multiplexing. Each of the optical transmission equipment Site-A to Site-Z includes a WSS (Wavelength Selective Switch) which is a multiplexer/demultiplexer, an OCM (Optical Channel Monitor) which is a wavelength monitoring device, an optical transmitter E/O, an optical receiver O/E, and an MC (management complex) which is a monitoring control unit. Although the optical communication system 7 includes an optical amplifier, a communication element for an opposite direction, and the like, illustration of these components are omitted in FIG. 16. Although, in the present embodiment, a case in which the optical communication system 7 forms a linear network is described, other types of networks may be formed, such as a ring network or a mesh network. Also, in the present embodiment, although a case in which the optical communication system 7 includes the WSS as a multiplexer/demultiplexer is explained, the optical communication system may include a different type of multiplexer/demultiplexer such as an AWG (Arrayed-Waveguide Grating).

In the optical communication system 7, the optical transmission equipment Site-A modulates an optical signal of a reference wavelength $\lambda_n$ by using an optical transmitter such as the optical transmitter 901, and the optical transmission equipment Site-B modulates an optical signal of a reference wavelength $\lambda_m$ by using an optical transmitter such as the optical transmitter 6. Note that the wavelength $\lambda_m$ is adjacent to the wavelength $\lambda_n$.

Figure 17:
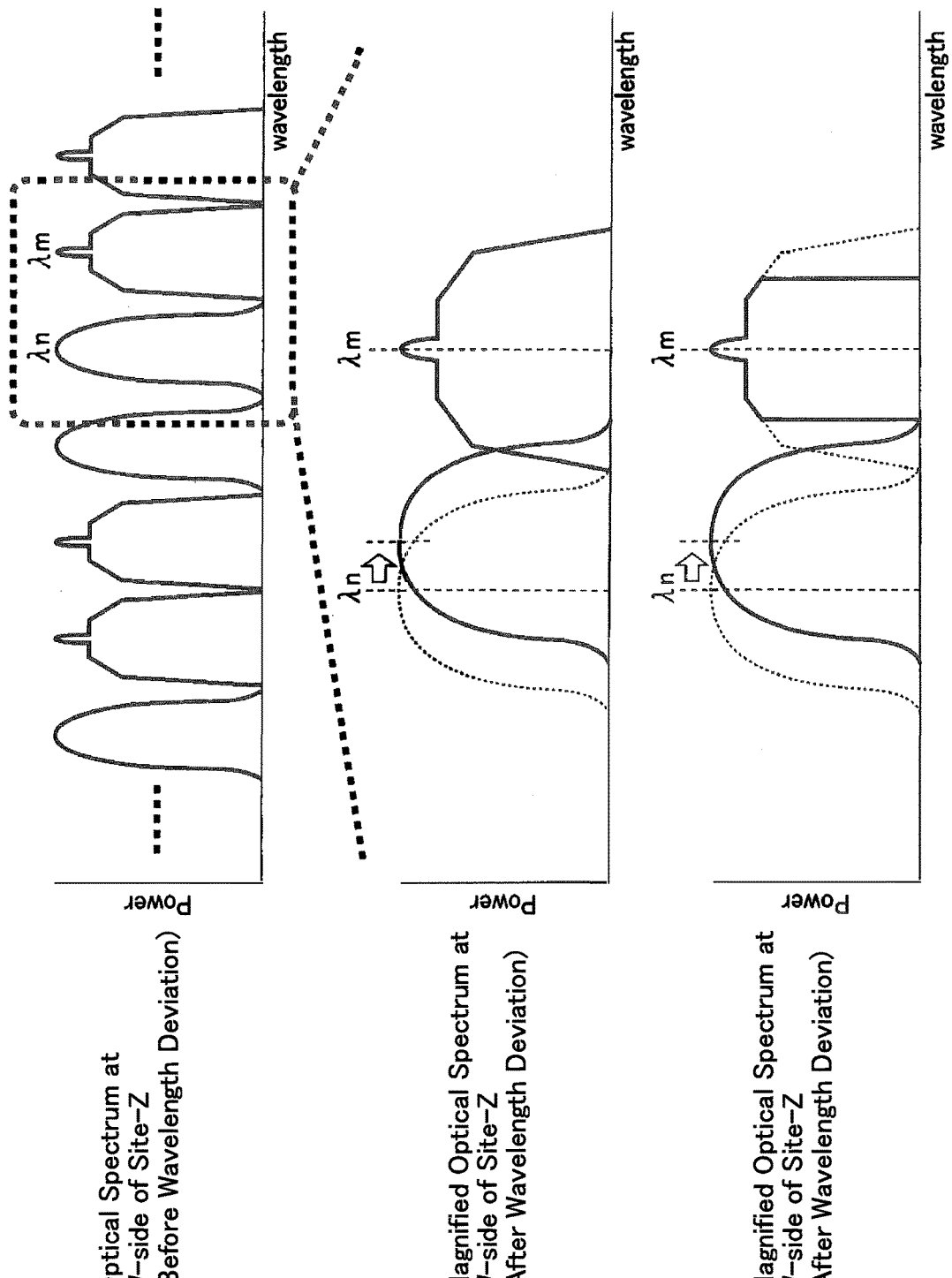
FIG. 17 is a diagram illustrating an operation of the optical transmitter in the optical communication system illustrated in FIG. 16.

FIG. 17 is a diagram illustrating an operation of the optical transmitter 6 in the optical communication system 7.

When a wavelength of an optical transmission signal from the optical transmission equipment Site-A deviates from the reference wavelength $\lambda_n$ toward a wavelength $\lambda_m$, and the optical transmission signal from the optical transmission equipment Site-A is overlapped with an optical transmission signal from the optical transmission equipment Site-B, the optical communication system 7 can detect this event. For example, any of the OCMs in the optical transmission equipment Site-A to Site-Z detects that the optical transmission signal from the optical transmission equipment Site-A is overlapped with the optical transmission signal from the optical transmission equipment Site-B. The OCM, having detected that the optical transmission signal from the optical transmission equipment Site-A is overlapped with the optical transmission signal from the optical transmission equipment Site-B, outputs to the optical transmitter 6 in the optical transmission equipment Site-B, an occupied bandwidth change request signal instructing to change a size of a bandwidth (occupied bandwidth) in which subcarriers can be placed. In response to an input of the occupied bandwidth change request signal, the optical transmitter 6 reduces the number of subcarriers.

Figure 18:
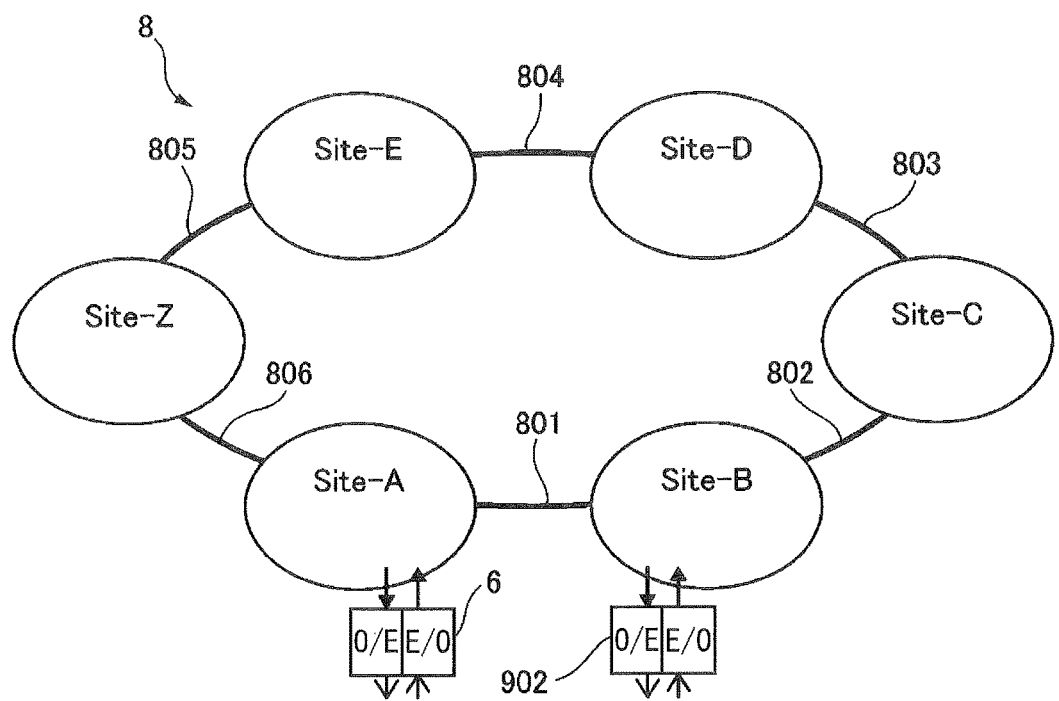
FIG. 18 is a diagram illustrating another example of an optical communication system employing the optical transmitter illustrated in FIG. 15.

FIG. 18 is a diagram illustrating another example of an optical communication system employing the optical transmitter 6.

An optical communication system 7 includes multiple optical transmission equipment Site-A to Site-Z for forming a ring network via transmission paths 801 to 806 and for performing wavelength multiplexing. Although each of the optical transmission equipment Site-A to Site-Z includes optical components such as a multiplexer/demultiplexer, illustration of these components are omitted in FIG. 18. Although, in the present embodiment, a case in which the optical communication system 8 forms a ring network is described, other types of networks may be formed, such as a linear network or a mesh network.

In the optical communication system 8, the optical transmission equipment Site-A modulates an optical signal by using the optical transmitter 6 and transmits the modulated optical signal to the optical transmission equipment Site-B. The optical transmission equipment Site-B receives the optical signal which is transmitted from the optical transmission equipment Site-A, by using an optical receiver 902 for example.

FIG. 19 is a diagram illustrating an operation of the optical transmitter 6 in the optical communication system 8.

In the optical communication system 8, the optical signal output from the optical transmission equipment Site-A is transmitted to the optical transmission equipment Site-B via the transmission path 801. However, when failure occurs in the transmission path 801, the optical signal output from the optical transmission equipment Site-A is transmitted to the optical transmission equipment Site-B via the other optical transmission equipment Site-C to Site-Z and the transmission paths 802 to 806. When an optical signal passes through each of the optical transmission equipment Site-C to Site-Z, the optical signal is transmitted via a multiplexer/demultiplexer of each of the optical transmission equipment Site-C to Site-Z. When an optical signal passes through each of the multiplexers/demultiplexers, PBN (Passband Narrowing) occurs and a transmission bandwidth decreases. When any of MCs in the optical transmission equipment Site-A to Site-Z detects that failure has occurred in the transmission path 801, the MC, having detected the failure, outputs to the optical transmitter 6 in the optical transmission equipment Site-B, the occupied bandwidth change request signal instructing to change a size of a bandwidth (occupied bandwidth) in which subcarriers can be placed. In response to an input of the occupied bandwidth change request signal, the optical transmitter 6 reduces the number of subcarriers.

<Advantageous Effect of the Optical Transmitter According to the Fifth Embodiment>

Because the optical transmitter 6 reduces the number of subcarriers when an occupied bandwidth change request signal is entered, the optical transmitter 6 can reduce the number of subcarriers even when a wavelength of a laser diode has not deviated from a reference wavelength.

For example, in a case in which the optical transmitter 6 is employed in the optical communication system 7, when a wavelength of an optical signal having adjacent wavelength has deviated, by changing a spectrum of a modulated signal at the optical transmitter 6 based on a transmission priority level, a signal having high priority can be transmitted.

Further, in a case in which the optical transmitter 6 is employed in the optical communication system 8, when a transmission path has changed, by changing the number of subcarriers, a reconfiguration of a transmission path can be made quickly without obtaining an SNR by taking a hundreds of milliseconds of time.

All examples and conditional language provided herein are intended for pedagogical purposes of aiding the reader in understanding the invention and the concepts contributed by the inventors to further the art, and are not to be construed as limitation to such specifically recited examples and conditions, nor does the organization of such examples in the specification relate to a showing of superiority and inferiority of the invention. Although one or more embodiments of the present invention have been described in detail, it should be understood that various changes, substitutions, and alterations could be made hereto without departing from the spirit and scope of the invention.

What is claimed is:
1. An optical transmitter comprising:
a light source;
a wavelength detecting unit configured to detect a wavelength of light emitted from the light source;
a wavelength difference information generating unit configured to generate wavelength difference information representing a wavelength difference between a predetermined reference wavelength and the wavelength of the light detected by the wavelength detecting unit;
a subcarrier count determination unit configured to determine, as a subcarrier count, a number of subcarriers to be used, based on the wavelength difference indicated by the wavelength difference information;
a multi-valued level determination unit configured to determine a multi-valued level for each of the subcarriers, the multi-valued level being a number of bits transmitted by a corresponding subcarrier of the subcarriers;
a modulated signal generating unit configured to generate a modulated signal by modulating the subcarriers, each of the subcarriers being configured to have the determined multi-valued level;
a modulator configured to output a transmission signal generated by modulating the light emitted from the light source based on the modulated signal; and
a driver circuit configured to output the modulated signal generated by the modulated signal generating unit to the modulator.

2. The optical transmitter according to claim 1, further including a wavelength deviation signal output unit configured to output a wavelength deviation signal indicating that the wavelength of the light emitted from the light source deviates from the reference wavelength, in a case in which the subcarrier count determined by the subcarrier count determination unit is less than a default subcarrier count.

3. The optical transmitter according to claim 1, further including a power determination unit configured to determine an electric power of the modulated signal,
wherein, in a case in which the wavelength of the light detected by the wavelength detecting unit is equal to the reference wavelength, the subcarrier count is determined to be equal to a default subcarrier count by the subcarrier count determination unit; and
in a case in which the subcarrier count determined by the subcarrier count determination unit is less than the default subcarrier count, the power determination unit is configured to determine an electric power of each of the subcarriers such that an electric power of the modulated signal is equal to an electric power of a modulated signal appearing in a case in which the subcarrier count is equal to the default subcarrier count.

4. The optical transmitter according to claim 3, wherein, in the case in which the subcarrier count determined by the subcarrier count determination unit is less than the default subcarrier count, the multi-valued level determination unit is configured to determine the multi-valued level such that a sum of the number of bits transmitted by the subcarriers is equal to a sum of the number of bits transmitted by subcarriers determined in a case in which the subcarrier count is equal to the default subcarrier count.

5. The optical transmitter according to claim 1, further including a power determination unit configured to determine an electric power of the modulated signal,
wherein, in a case in which an amount of diminution of an electric power of the modulated signal output from the driver circuit to the modulator exceeds a predetermined threshold because of reduction of the subcarrier count, the power determination unit is configured to output the amount of diminution to the driver circuit as a power adjustment value; and
the driver circuit is configured, in response to receiving the power adjustment value, to increase power of the modulated signal to compensate for a decrease of an electric power corresponding to the power adjustment value.

6. The optical transmitter according to claim 1, wherein the subcarrier count determination unit is configured to reduce the subcarrier count, in response to an input of an occupied bandwidth change request signal instructing to change a size of a bandwidth to which the subcarriers can be assigned.

7. An optical transmitting method comprising:
detecting a wavelength of light emitted from a light source;

generating wavelength difference information representing a wavelength difference between a predetermined reference wavelength and the wavelength of the light;

determining, as a subcarrier count, a number of subcarriers to be used, based on the wavelength difference indicated by the wavelength difference information;

determining a multi-valued level for each of the subcarriers, the multi-valued level being a number of bits transmitted by a corresponding subcarrier of the subcarriers;

generating a modulated signal by modulating the subcarriers, each of the subcarriers being configured to have the determined multi-valued level; and outputting a transmission signal generated by modulating the light emitted from the light source based on the modulated signal.

* * * * *